Oct. 26, 1965 M. H. JOHNSON 3,213,897

METHOD OF MOUNTING SCREEN MATERIAL IN SCREEN FRAMES

Filed Oct. 17, 1961 13 Sheets-Sheet 1

INVENTOR.

MARVIN.H.JOHNSON.

BY Francis D. Ammen

Atty.

METHOD OF MOUNTING SCREEN MATERIAL IN SCREEN FRAMES

Filed Oct. 17, 1961 13 Sheets-Sheet 2

INVENTOR.
MARVIN. H. JOHNSON.
BY Francis D. Ammen
Atty.

Oct. 26, 1965 M. H. JOHNSON 3,213,897

METHOD OF MOUNTING SCREEN MATERIAL IN SCREEN FRAMES

Filed Oct. 17, 1961 13 Sheets-Sheet 3

INVENTOR.
MARVIN. H. JOHNSON.
BY
Francis D. Amman
Atty.

INVENTOR.
MARVIN H. JOHNSON.
BY Francis D. Ammen
Atty.

METHOD OF MOUNTING SCREEN MATERIAL IN SCREEN FRAMES

Filed Oct. 17, 1961 13 Sheets-Sheet 5

INVENTOR.
MARVIN.H.JOHNSON.
BY Francis D. Dunnen
Atty.

INVENTOR.
MARVIN H. JOHNSON.
BY Francis D. Ammen
Atty.

INVENTOR.
MARVIN H. JOHNSON.
BY Francis D. Ammen
Atty.

METHOD OF MOUNTING SCREEN MATERIAL IN SCREEN FRAMES

Filed Oct. 17, 1961 13 Sheets-Sheet 8

INVENTOR.
MARVIN. H. JOHNSON.
BY Francis D. Aumen
Atty.

INVENTOR.
MARVIN. H. JOHNSON.
BY Francis D. Amman
Atty.

INVENTOR.
MARVIN. H. JOHNSON.
BY Francis D. Ammen
Atty.

METHOD OF MOUNTING SCREEN MATERIAL IN SCREEN FRAMES

Filed Oct. 17, 1961

INVENTOR.
MARVIN. H. JOHNSON.
BY Francis D. Ammen
Atty.

INVENTOR.
MARVIN. H. JOHNSON.
BY Francis D. Ammen
Atty.

Oct. 26, 1965 M. H. JOHNSON 3,213,897

METHOD OF MOUNTING SCREEN MATERIAL IN SCREEN FRAMES

Filed Oct. 17, 1961 13 Sheets-Sheet 13

INVENTOR.
MARVIN. H. JOHNSON.
BY Francis D. [signature]
Atty.

United States Patent Office 3,213,897

Patented Oct. 26, 1965

3,213,897

METHOD OF MOUNTING SCREEN MATERIAL IN SCREEN FRAMES

Marvin H. Johnson, 1330 W. Garvey Ave., Monterey Park, Calif.

Filed Oct. 17, 1961, Ser. No. 145,568
22 Claims. (Cl. 140—109)

This invention relates to a machine that is used to mount screen material in frames that are placed in windows to prevent flies, mosquitoes or other insects from entering houses.

In modern practice the screen frames are composed of metal and are generally very light because they are made up of thin sheet metal formed up into hollow side bars, each having a narrow channel extending along each side bar of the frame and close to the inner edge of the side bar, that is to say, the edge that is toward the area that the frame surrounds.

The screen material may be attached by hand operations into the channels of the frame, and secured there by means of a spline forced into the channel to maintain the edge of the screen in place; such operations are quite slow and laborious.

In accordance with the present invention a panel of the screen material is laid over the frame, while in a horizontal position.

As the screen panel is of slightly greater area than the opening in the frame, the margin of the panel will project far enough to overlie the channels into which this overlying margin must be bent down.

One of the objects of this invention is to produce a machine that will provide means for guiding and advancing the frame and panel along a path, adjacent to which are located devices that will function (a) to clamp the panel to the frame, (b) to tuck the overlying edge of the panel down into the channel, and (c) to maintain the tucked-in overlying edge securely in place within the channel. In the present instance this last operation is accomplished by using a tough flexible length of material that is called a spline, which is pressed down forcibly into the channel.

The above operations are largely performed automatically by the machine but are supervised and directed by the operator of the machine, particularly the operation of seating the splining material in the channel.

After completing the securing of one edge of the screen panel into the frame, the operator rotates the frame in its own plane through 90 degrees counterclockwise and replaces it on the table in that orientated position to effect the attachment of the adjacent portion of the overlying margin of screen material on the next side bar of the frame.

An object incidental to this phase of the procedure is to provide means contributing to effect a quick set-up of the machine for effecting the attachment of the margin of the screen material in the next channel in the frame.

Another object of the invention is to provide carriers for the roller that is employed for clamping the screen panel to the frame, and for the tucker roller that bends down the overlying edge of the screen panel into the channel; and to provide control devices for these rollers alongside the path of movement of the "work" along its path of movement for automatically activating their carriers for withdrawing them and the splining roller that effects the securing of the screen material within the channel.

A further object of the invention is to provide pneumatic means for accomplishing these purposes, and for returning the carriers to their normal positions of rest.

A machine such as this should be capable of performing its functions on screen doors as well as on frames to be used in windows, so one of my objects is to construct the machine so that it can accommodate itself to perform satisfactorily on screen doors as well as upon the frames that are to be used in windows.

Another object of the invention is to provide means for effecting adjustments of the guiding means for the work as it moves along the path through the machine, and also for effecting its advance along its path.

Another object is to provide a mounted supply spool for the spline material that will facilitate the paying out of the spline above and in line with, the splining point.

Another object of the present invention is to provide apparatus the use of which will enable a greatly improved screening method to be realized, by eliminating the use of framing or jigs to contain and hold the screen frame while the opening of the screen frame is being covered with any one of the various types of screening material now being used. Under the many methods of screening frames, jigs have been used in attempts to eliminate distortions due to stresses developed in the side members of the frame while placing the screen within it by means of a spline requiring force to secure it in the channels in the bars of the frame.

The apparatus and method used in the present invention prevent the development of such distortions in the side members of the screen frame, and preferably employs pressure rollers or wheels that roll on the upper face of the screen frame adjacent the points where the securing of the screen occurs, and also provides for adjustments in setting the position of the tucker wheel at suitable angles to increase its efficiency in securing the edge of the screen in place.

Another object of the invention is to utilize a conveyance means with electric controls and air pressure service in controlling the movements of the tooling members that accomplish the purpose of the invention while eliminating the constant walking around the table by the operator as is often required in the usual manual operations for screening such frames.

A further object is to provide means during the processing for intimate gaging, guiding and the provision of other means to enable the apparatus to accommodate itself for operation upon different widths of screen members; including screen doors with different stile widths, with top rails or bottom rails or kick-plates and solid panelling.

Another object of the invention is to provide a mounting for the spline reel that will permit the reel body to shift itself along the line in which its axis lies. This is to keep the point at which the spline leaves the reel always in a single plane in which the line of spline drawn off from the reel extends itself above the point where the splining operation is taking place.

This eliminates the development of tension that might cause a reduction in diameter of the spline that would reduce its efficiency in holding the edge of the screen material in its channel or groove.

Further objects of the invention will become apparent from a careful reading of the accompanying specification and study of the accompanying drawing.

The vention consists in the novel parts and combinations of parts to be described hereinafter, all of which contribute to produce an efficient machine for mounting screen material in frames for windows, and screen doors.

A preferred embodiment of the invention is described in the following specification, while the broad scope of the invention is pointed out in the appended claims.

In the drawing:

FIGURE 1 is a plan of the screen mounting machine that embodies the invention described in the following specification, but omits the body of the supply roll that carries the spline material in a way that delivers it in line with the splining roller.

FIGURE 1*a* is a longitudinal horizontal section through one of two automatic activators controlled by the pressure of operating air in the cylinders that operate the rams that carry the presser roller and the splining disc; their activations control two microswitches and establish circuits functioning in the machine.

FIGURE 1*b* is a vertical section through a solenoid operated valve, three of which are employed in the machine to supply the high pressure air to the actuating cylinders for advancing the tools of the machine to do their work alongside the path of the advancing work, that is, the panel of screen material and the rigid member in which it is being mounted.

FIGURES 2*a* and 2*b* should be read together, the former being a front elevation of the upper portion of the machine, and the latter showing the lower portion of the same view of the machine. Incidentally, the supply roll for the spline shown in FIGURE 2*a* is broken away so as to be partly in section as viewed in FIGURE 12.

FIGURE 2*c* is a horizontal section through one of the pressure regulators.

FIGURE 2*e* is a fragmentary perspective of a valve stem shown in FIGURE 1*b*.

FIGURE 2*f* is a partial horizontal section through one of the gauges.

FIGURE 3 is a small detail view showing parts of the structure that is called a "fence" because it guides, and determines the location of the path of the side of the work that is close to the operator of the machine; this view is broken away at the middle portion.

FIGURES 4*a* and 4*b* should be read together as they constitute an end elevation of the machine, and the view is looking toward the destination of the work as it passes the location of the tools, and shows the portion of the driving belt that comes up from the pulley shown in FIGURE 4*b*.

In this view the work is represented as having already had one of the channels splined that extends at right angles to the one that the tools are represented as now operating upon.

Figures 6, 6A, 6B:
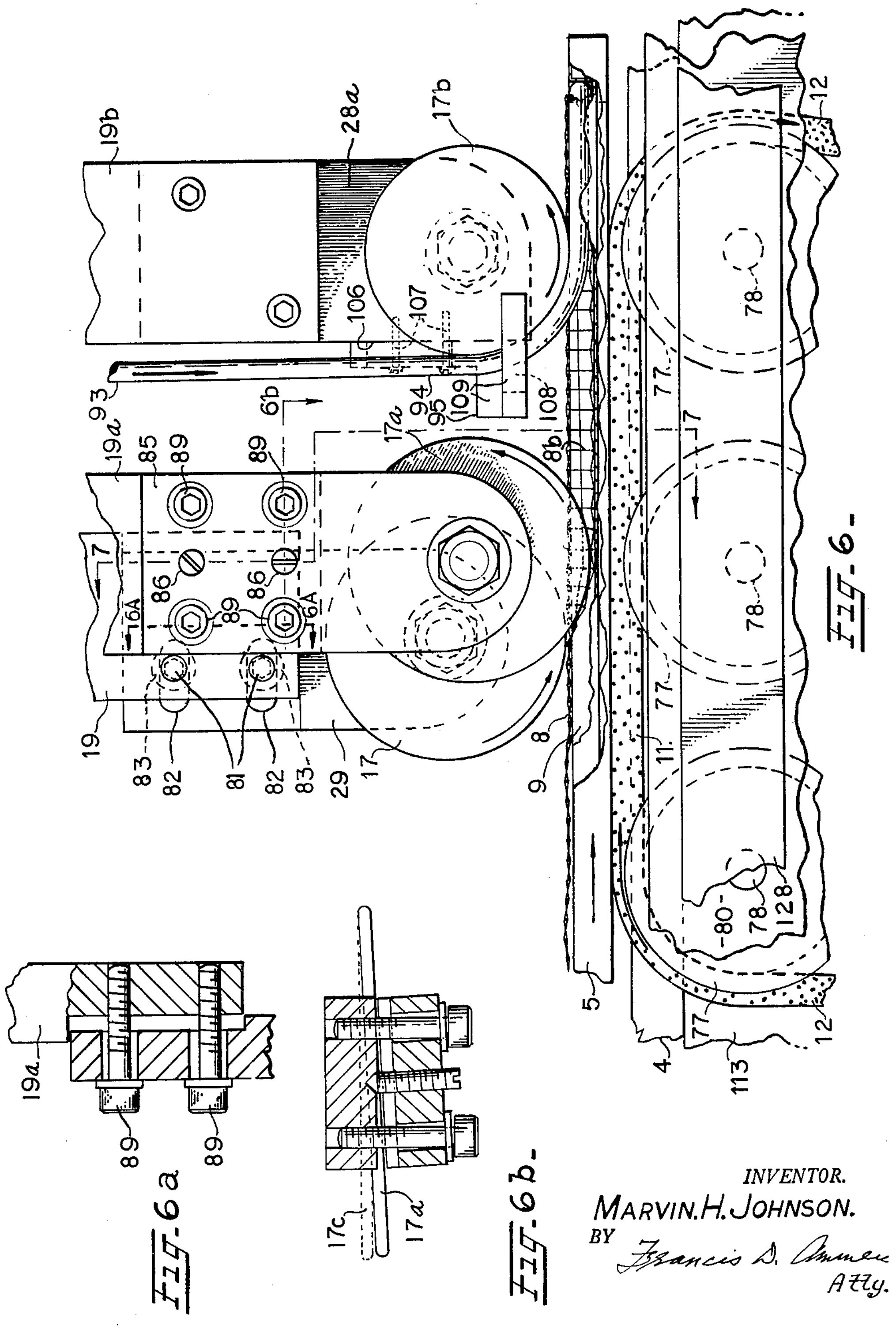
FIGURE 6 is a front elevation upon a relatively large scale showing the frame of the work supported on the driving belt for it, that moves it along its path past the presser disc and the tucker disc that cooperate respectively to clamp the screen panel forcibly to the frame, and to tuck the overlying edge of the screen down into the channel.

FIGURE 6*a* is a vertical section taken on the line **6*a*—6*a*** on FIGURE 6 further illustrating the capacity of the mounting for the tucker roller for making adjustments.

FIGURE 6*b* is a horizontal section on the line **6*b*—6*b*** of FIGURE 6, illustrating features employed to facilitate the making of adjustments for the plane in which the tucker disc is held.

Figure 7:
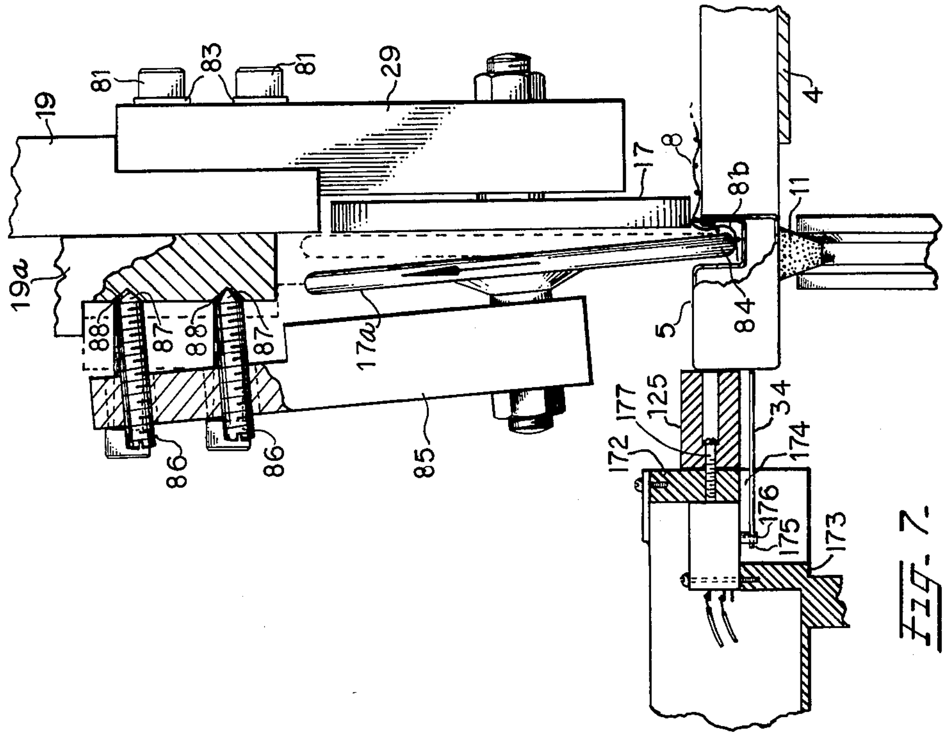

FIGURE 7 is an elevation and partial section taken in the plane of the line 7—7 on FIGURE 6 to further illustrate the capacity for adjustment that resides in the mounting for the tucker roller or disc and with presser disc adjacent to the tucker roller.

Figure 8:
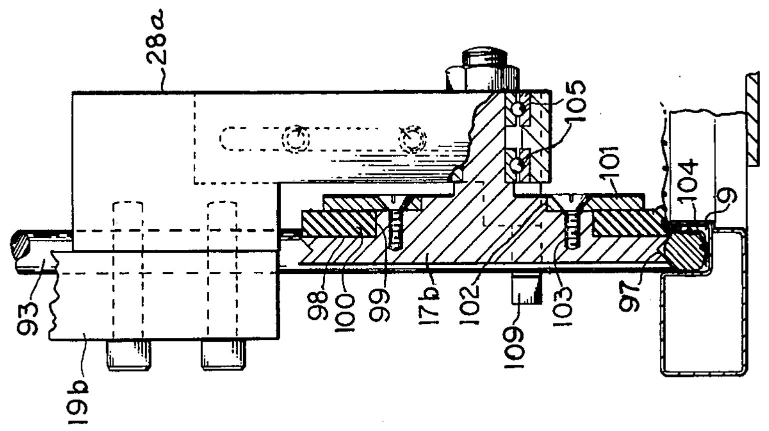

FIGURE 8 is a vertical section through the splining roller, and illustrating means I prefer to employ for insuring the proper action of the splining roller to prevent any recession of the overlying material of the screen when the splining roller is performing its function.

Figures 9, 10:
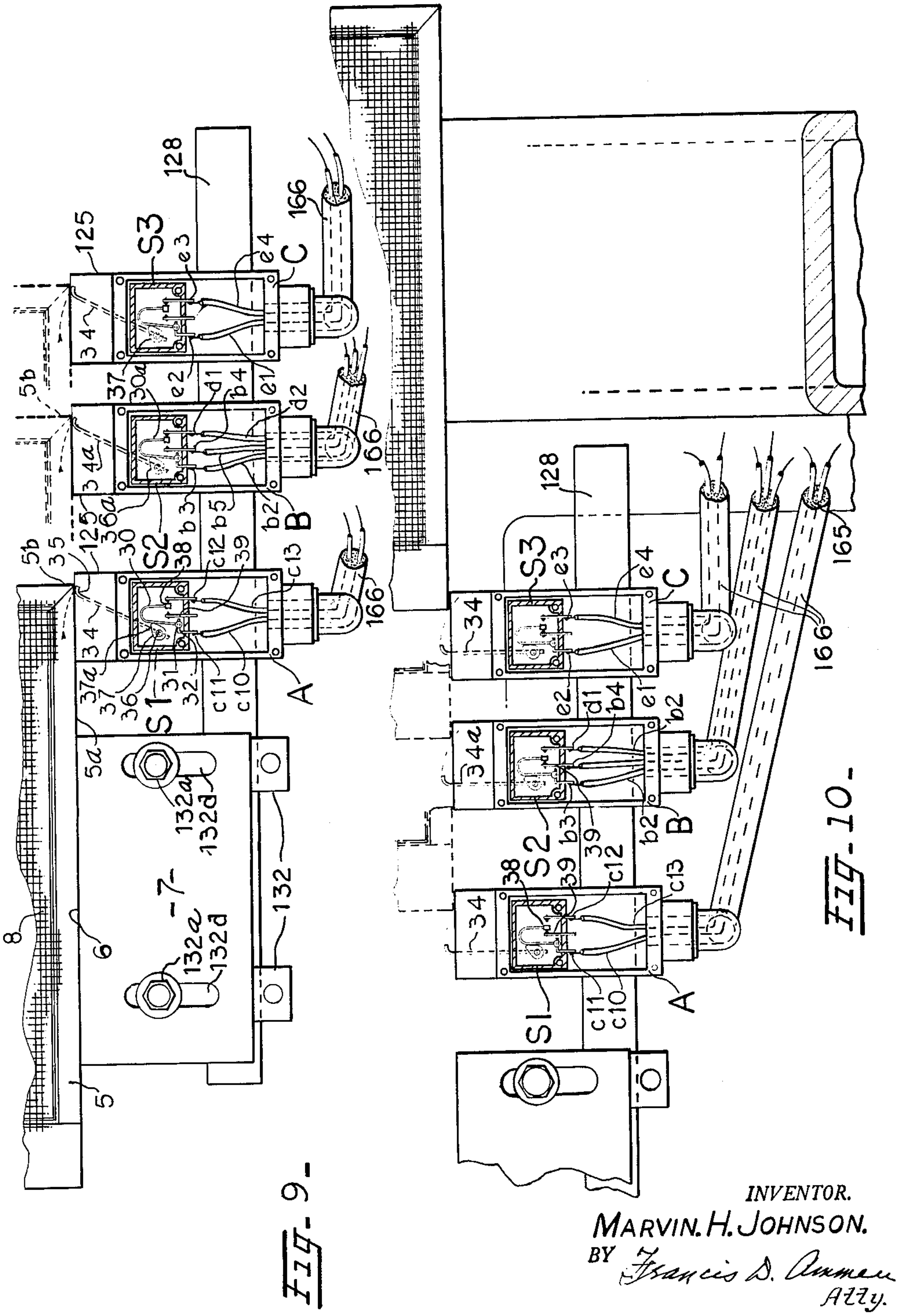

FIGURE 9 is a top plan view and a partial section illustrating several control devices spaced apart alongside the path of movement of the work, that are operated by the forward end of the frame of the work to effect the performance of the tools of the machine in their proper sequence, and also to effect the return of all the tools to their position of rest after the work has completed its course of travel over and within the channel that is to be supplied with the spline that will lock all the margins of the screen into all the channels presented by the frame of the work.

FIGURE 10 is also a plan showing the same control devices but illustrating how they are returned automatically to their normal state by the passing of the rear end of the frame of the work out of operative contact with the same.

Figure 11:
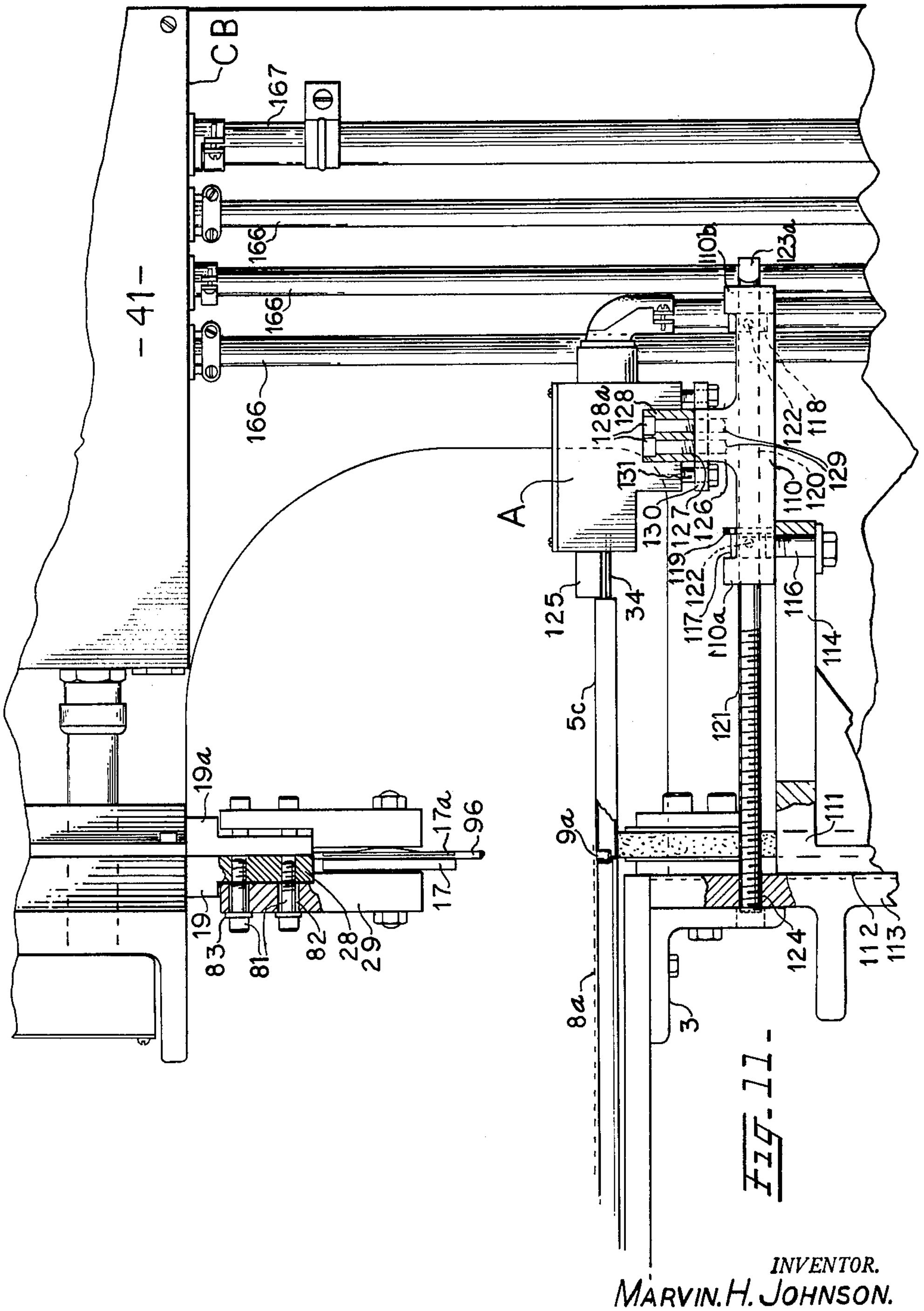

FIGURE 11 is a side elevation and partial section illustrating means employed in the machine to enable it to be used to mount screens in frames of screen doors, or other frames that have larger areas at their lower ends that are not to be covered by screen material.

Figures 12, 12A, 12B:
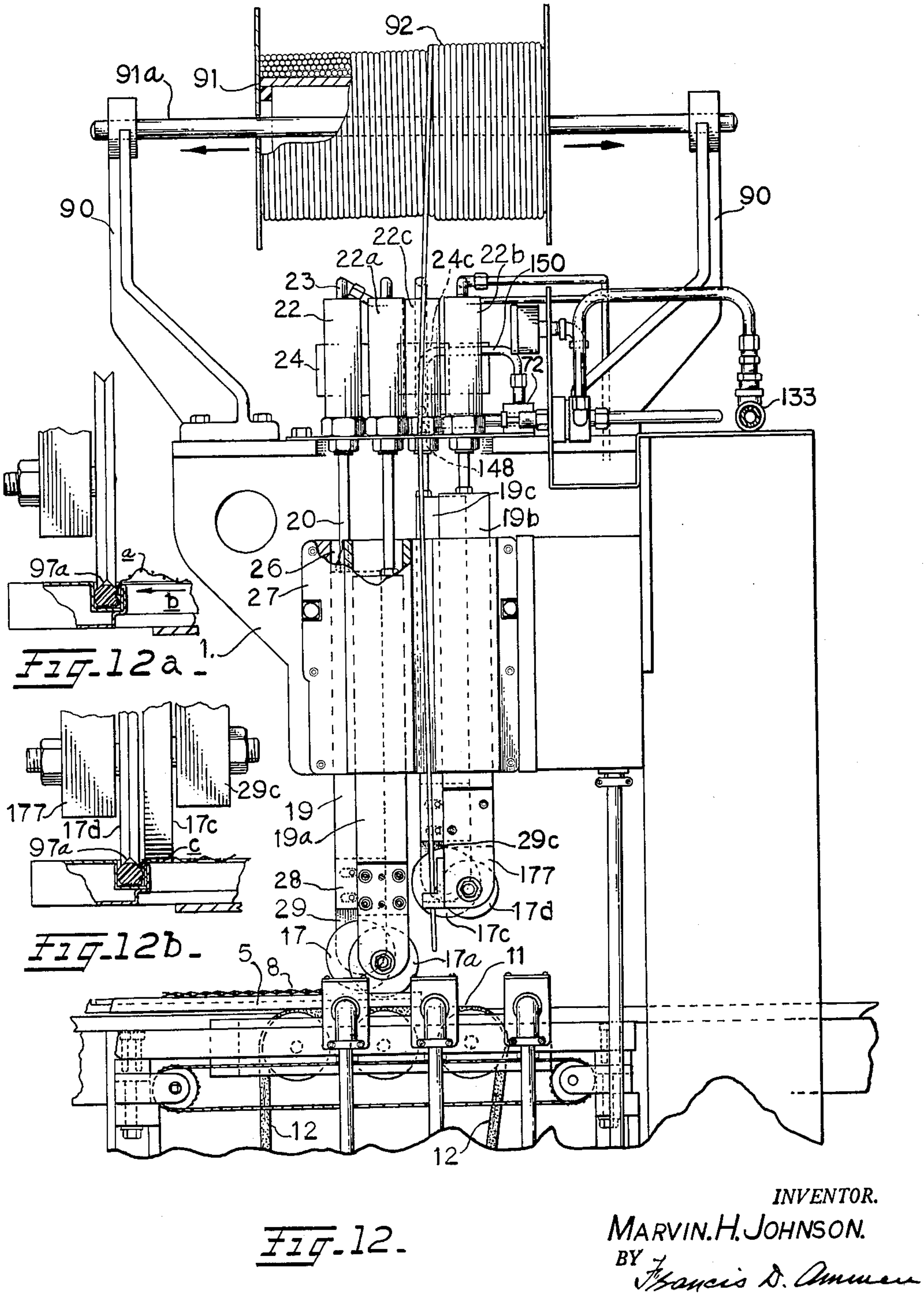

FIGURE 12 is a front elevation of the upper part of the machine, but in which the reel or drum that carries the spline is shown in partial section; and this view also illustrates an auxiliary presser wheel with its own ram and power cylinder.

FIGURE 12*a* is a detail section illustrating a difficulty that may arise in connection with the splining operation.

FIGURE 12*b* is a similar sectional view but illustrating how the difficulty illustrated in FIGURE 12*a* could be overcome.

Figure 13:
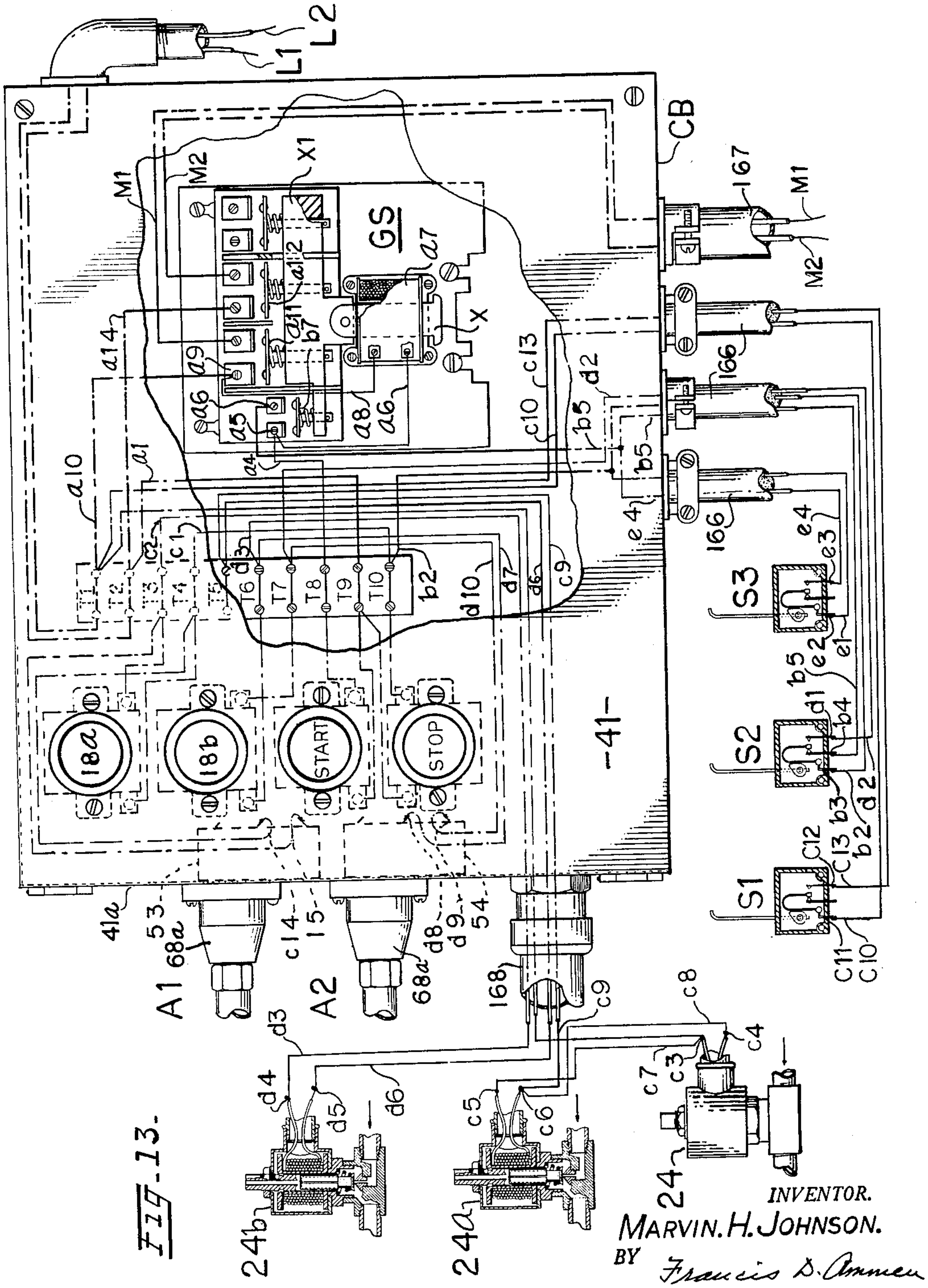

FIGURE 13 is a view showing the control panel broken away to disclose more clearly the control switches within the same, and diagrammatically showing their connections to pushbutton controls and to three solenoid valves controlled by the circuits to effect the exhausting of the cylinders from high pressure air in order to facilitate returning the rams and the tools carried thereby, to their normal positions of rest.

Figure 14:
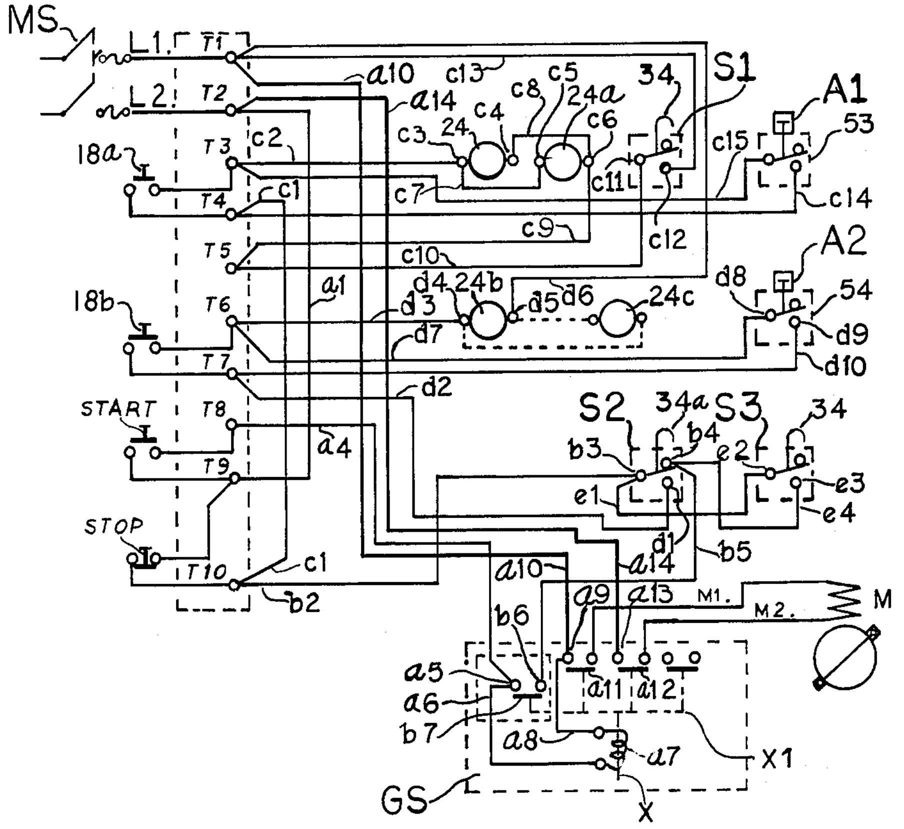

FIGURE 14 is a complete diagram of the wiring including that which is shown in FIGURE 13, and in this view the wires are shown leading to symbols representing the actual machine parts.

Figure 1:
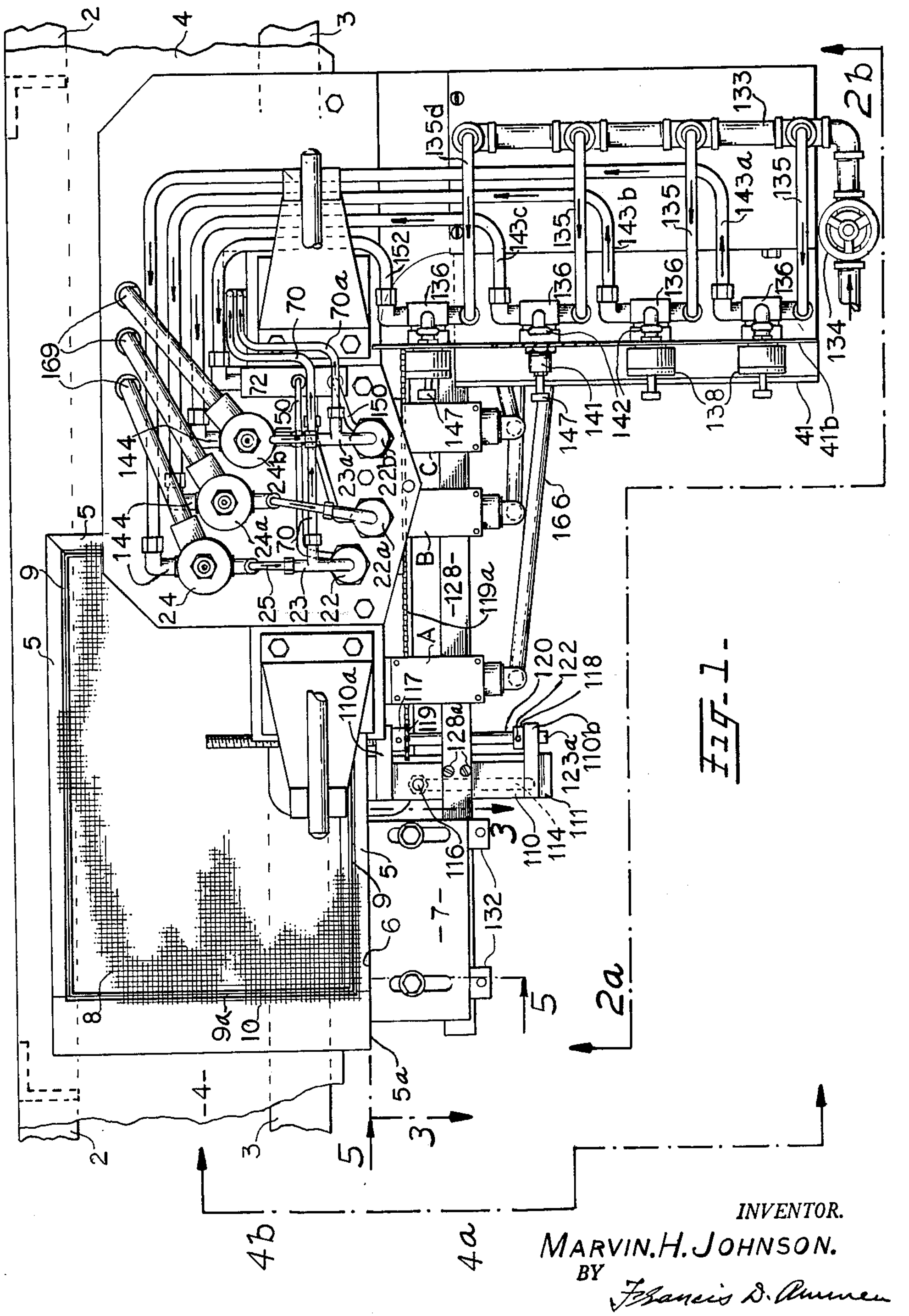
Figures 2A, 3:
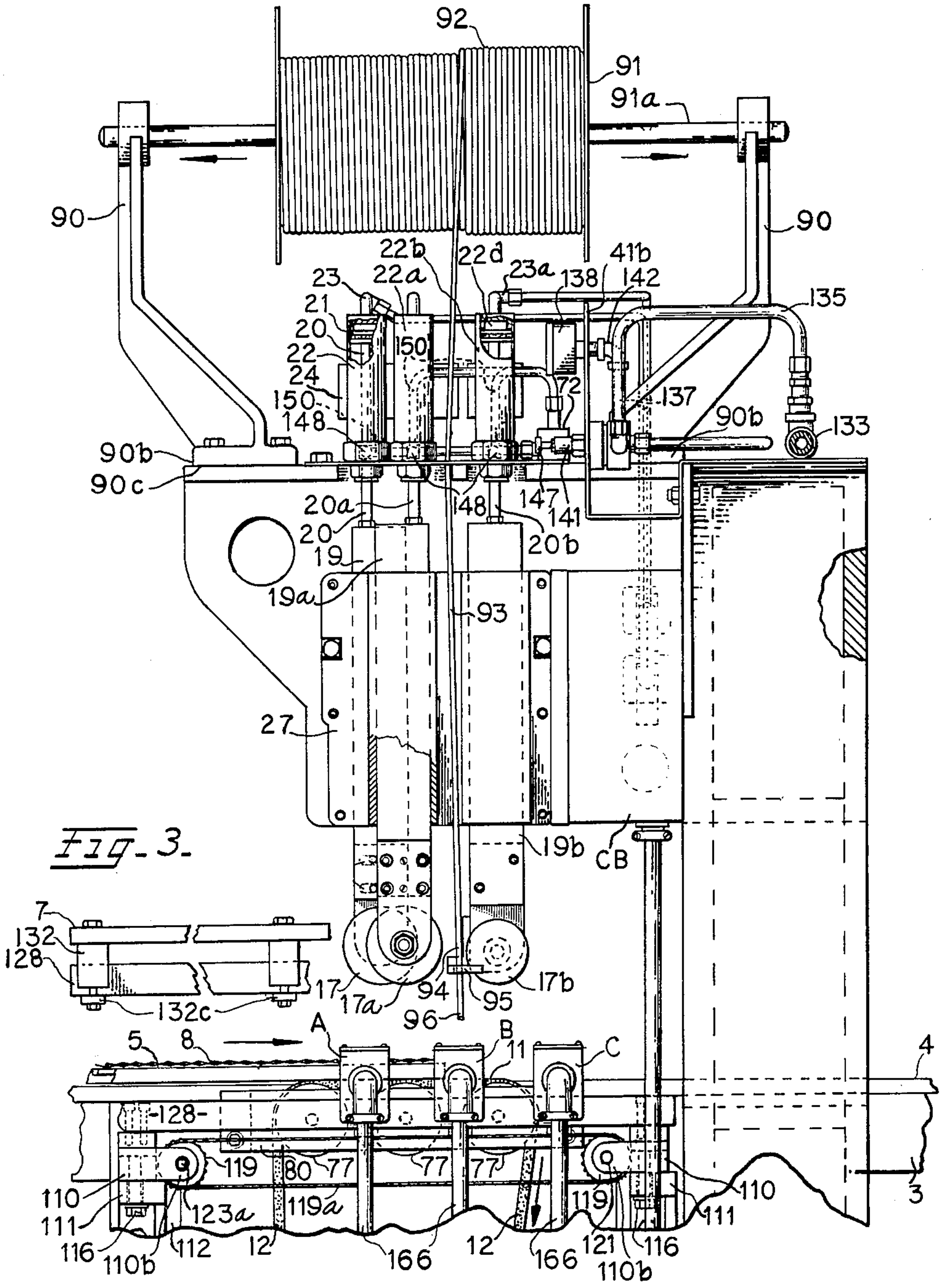

Referring more particularly to the parts, and especially to FIGURES 1 and 2*a*, the former of which is a plan view and the latter of which is a front elevation of the upper portion of the machine broken away.

The machine includes a frame 1 which embodies two horizontal bars 2 and 3, which support a horizontal table 4 on which rests the frame 5 of the work.

When the frame 5 is resting on the table its edge **5*a* that is adjacent to the operator's place and rests up against a guide which is commonly called a "fence" 7, and on the upper face of the frame 5 the screen material 8 will have been placed in a centered position with its edges projecting on all sides about an equal distance, its marginal edge portions 10 overlying the channels 9; and the function of the machine is to tuck these marginal edges of the screen down into the channels 9 as the frame 5** is being advanced toward the right, as indicated by the arrow in FIGURE 2*a*.

Figure 2B:
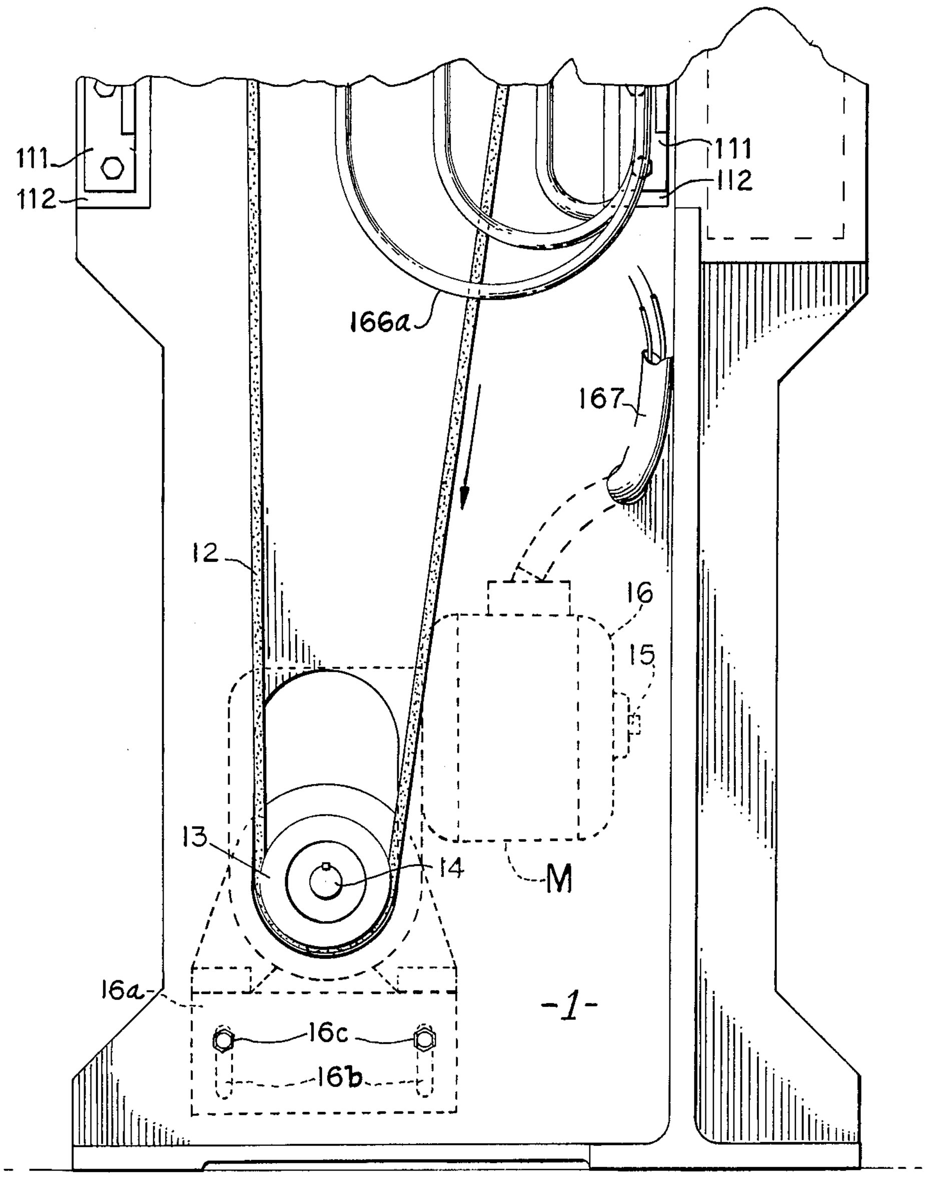

As the frame with the screen material 8 carried on it is being advanced by the horizontal run 11 of a belt 12, which belt is driven by a sheave or pulley 13 as shown in FIGURE 2*b* which hangs in a loop, hanging down from the ends of the horizontal run 11. This pulley 13 is keyed on a countershaft 14 driven off the shaft 15 of an electric motor 16, seated on adjustable support bracket **16*a*, having vertical slotted holes 16*b* that contains bolts 16*c* to secure the same to the frame 1**, shown in dotted lines in FIGURE 2*b*.

The frame 5 as it advances, of course, is held by the operator pressed lightly against the fence 7 which is guiding it in a working line past three control boxes one function of which is to actuate means for stopping the driving means that is effecting the advancing of the work.

These control boxes also control the movements of the tools to their positions of rest, and this is preferably effected by means of a fluid under pressure. The fluid employed is preferably compressed air; and it is also preferable to control the compressed air through the agency of regulators that maintain a constant pressure for the air that controls the advancing and withdrawing movements of the tools.

But when activating the tool that effects the tucking of the overlying edges into the channels, it is necessary to provide means in the vicinity of the operating area, to clamp the screen material forcibly against the upper face of the frame to prevent any possibility of shifting of the panel of screen material during the operations that must be performed upon it. This clamping is effected by a tool shown clearly in FIGURES 6 and 7, which preferably consist of a disc or presser roller 17 which preferably has a flat circular perimeter, and of course, should be of sufficiently hard material to perforom its function of pushing with considerable force against the screen material without marring in any way the surface of the disc's perimeter. This presser roller is also referred to as a "hold-down" roller.

When the operator feels certain that the screen material is properly centered on the frame and has advanced the work so that the forward portion of the work is located in line with the vertical axis passing through the disc 17 he pushes an electric circuit button 18 (see FIGURE 4*a*) which closes a circuit through the motor which will be described in detail at another point herein. In this drawing the button is labelled "Start."

The closing of another circuit by push button **18*a* effects the advance of a ram 19 attached to the lower end of a piston rod 20** (see FIGURE 2*a*), and carrying a piston 21 in a power cylinder 22. The piston is forced downward by compressed air admitted through the upper head of the cylinder through a pipe connection 23. (Also see FIGURE 1.)

This is accomplished in the present instance through the medium of a valve which is preferably a solenoid-operated valve, the coil of which is in the electrical circuit closed by the button **18*a*** when it is depressed.

The solenoid valve 24 just referred to, is indicated clearly in FIGURE 1 and also the pipe 25 which passes from the side wall of the solenoid valve to the cylinder through a pipe fitting 23 already referred to. There are three of these valves 24, **24*a* and 24*b***.

Figures 4A, 5:
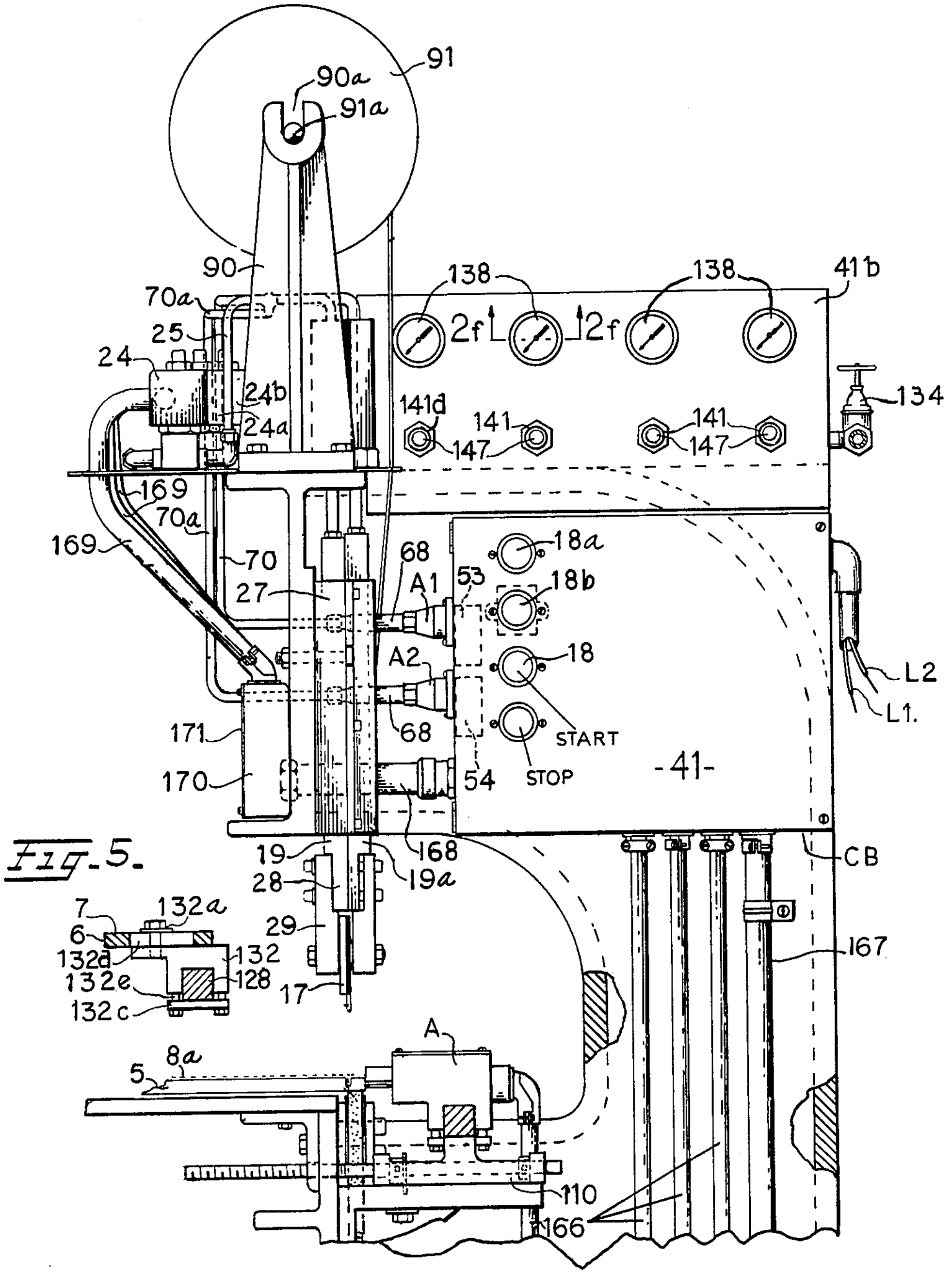
FIGURE 5 is an elevation and partial section through the fence that has been referred to above.

As indicated in FIGURES 12 and 4*a*, the ram 19 is guided to slide down in a vertical guide space 26 in a 2-piece casing-type bracket 27 supported on the frame 1 of the machine. At the lower end of the ram 19 it has a thinner fin 28 projecting down from it, on which is bolted a carrier or carriage 29 on which is rotatably mounted a presser wheel 17. This presser wheel has a central bearing for rotation about an axis that is in a horizontal plane, and extending at right angles to the path of movement of the work.

As soon as the under face of the presser wheel or disc 17 touches the screen material 8 below it, the wheel exerts considerable force upon the upper side of the screen to clamp it firmly against the upper face of the frame 5 of the work; and at the same time forms traction to the under side of frame 5 to the top of belt run 11, permitting the frame with the screen material 8 to advance past the location of the presser wheel.

Now referring to FIGURE 9 which is a plan of the fence and the three control devices, A, B, and C, which are provided with switches S1, S2, and S3, within them, it should be understood that these switches, each includes movable inverted spring-type U-shaped contact 30 which includes an extension body portion fixedly attached at 31 to a fixed contact 32, and to which is attached a terminal for an insulated conductor.

In the path of the frame 5 are three switch levers, levers 34, and one lever **34*a*, and all with a curved tip 35 for cooperation with the forward corner 5*b* and adjacent face 5*a* of the frame, to swing the lever toward the right, as illustrated in FIGURE 9; and the body portion of this lever 34 lies below the bottom wall of the switch and is attached to a small stub-shaft 36 rotatable in the bottom of the housing; and carries a small cam 37, which has a tapered tip 37*a* that is moved into contact with the body portion of the movable U-shaped contact 30**. This movement closes the switch.

In the normal position of this switch the lever 34 extends horizontally into the path of the frame 5, being held in that position by the resiliency of the curved portion of the U-shaped contact 30. FIGURE 10 shows the normal position of rest for the U-shaped contact, holding its back against the adjacent flat face of the cam. And in this position of the switch the tip 38 of this U-shaped contact is set against a dummy contact 39 that is anchored in the micronite wall of the switch housing. All the cams are composed of insulating material. S1, S2, and S3 are identical, but S2, makes use of contact 39 by attaching conductor *b5* to terminal *b4*.

Starting the operation of mounting the panel of screen material on the frame 5 will now be described.

After laying the frame 5 with the panel centered on it, upon the upper face of the table 4, the operator pulls the work toward him and presses the side of the frame 5 against the guiding edge 6 of the fence 7.

Having made sure that the panel 8 of screen material is properly centered on the frame, the operator then depresses push button 18 which is labelled "Start" in FIGURE 4*a*, as this will close the motor circuit and effect the driving of the belt 12, FIGURE 2*a*. This, of course, starts the advance of the work toward the right and toward the control devices A, B, and C, with their switches S1, S2, and S3. These switches shown in FIGURE 9, when activated, control and establish maintaining circuits for push button circuits that have been closed by depressing any of the push buttons on the control panel 41, except of course, the button marked "Stop" which opens the motor circuit.

When the forward corner **5*b* of the screen frame 5 actuates the switch lever 34 of the switch S1, this switch pre-establishes a circuit in conjunction with push button 18*a*** that includes conductors *c*10 and *c*13, but when this same corner of the frame actuates **34*a* of switch S2, the motor circuit is opened by the cam 36*a* that moves the inverted U-contact 30*a*** toward the right to engage contact with *d*1; thereby opening a motor circuit between conductors *b*4 and *b*3; and this incidentally, closes a control circuit to be described later, that effects the passage of high pressure air into the cylinders 22 and **22*a* (see FIGURE 1), and brings down rams 19 and 19*a*** that advance the hold-down disc and the tucker roller to the working line.

As explained in column 5 herein, this is accomplished through the agency of a type of solenoid valve. Preferably, there is one of these valves for each of the cylinders as the cylinders operated do not all function at the same time; the cylinder 22 actuates the ram 19 that carries the hold-down disc, or presser disc; it must be firmly clamping the panel 8 on the frame 5 when the tucker roller **17*a* is functioning to tuck the overlying marginal edge of the panel down into the channel. So the ram 19 that advances the presser disc 17 preferably moves down toward the working line before the ram 19*a* that carries the tucker-disc 17*a*** (FIGURE 2*a*).

A third power cylinder **22*b* is also provided to move down a third ram 19*b* that is also guided in the casing type bracket 27 that guides the ram 19 for the presser wheel and this third ram 19*b* carries the splining wheel 17*b*, or wheel 17*d*. The rams 19*a*, 19*b* and 19*c* are carried on piston rods 20*a*, 20*b* and 20*c* that are counterparts of the piston rod 20** already referred to.

The cylinders 22, **22*a* and 22*b* in the present instance are all alike. The upper end of the cylinder 22*b* is broken away to show clearance space 22*d* that is present in the upper end of all of these cylinders, 22, 22*a* and 22*b*, includer 22*c***, to insure that there will be a free flow of high pressure air above the pistons.

In FIGURE 13 the three solenoid valves 24, **24*a* and 24*b* are shown somewhat diagrammatically, two of them being in section, and the third one in side elevation. Each valve has its coil 42 mounted between 43 and 44**. (See also FIGURE 1*b*.)

The valve stem has a closure head 46 at its lower end. When at rest, a collar 47 at the lower end of the valve stem is biased onto its seat 48 by a spiral spring 48*a*. The seat is of conical form with a central port 49. The direction of flow of the high pressure air is from right to left in exhausting, as indicated by the dotted arrow. When the coil is energized to pull up the valve stem 45 it admits the air under pressure that flows through the outlet 145*a* to the cylinder to fill it and move down one or more of the rams 19, 19*a*, 19*b* and 19*c* under control by the operator. When the valve stem is raised by the energized coil its upper end comes upon the seat 50 at the lower end of the port 51; that shuts off the outlet 51 and permits the air to go to one of the cylinders 22, 22*a*, 22*b* or 22*c*, to fill it with air.

The longitudinal side ducts 52 in the outer face of the valve core that is the valve stem maintains communication between the two valve chambers in withdrawing the rams. In the position shown in the section a connected cylinder will be exhausting its air to atmosphere through the upper end of port 51. (See FIGURE 1*b* in this connection.)

When the machine is working, the coils 42, of course, must be maintained energized.

Figures 1A, 1B, 2C, 2E, 2F:
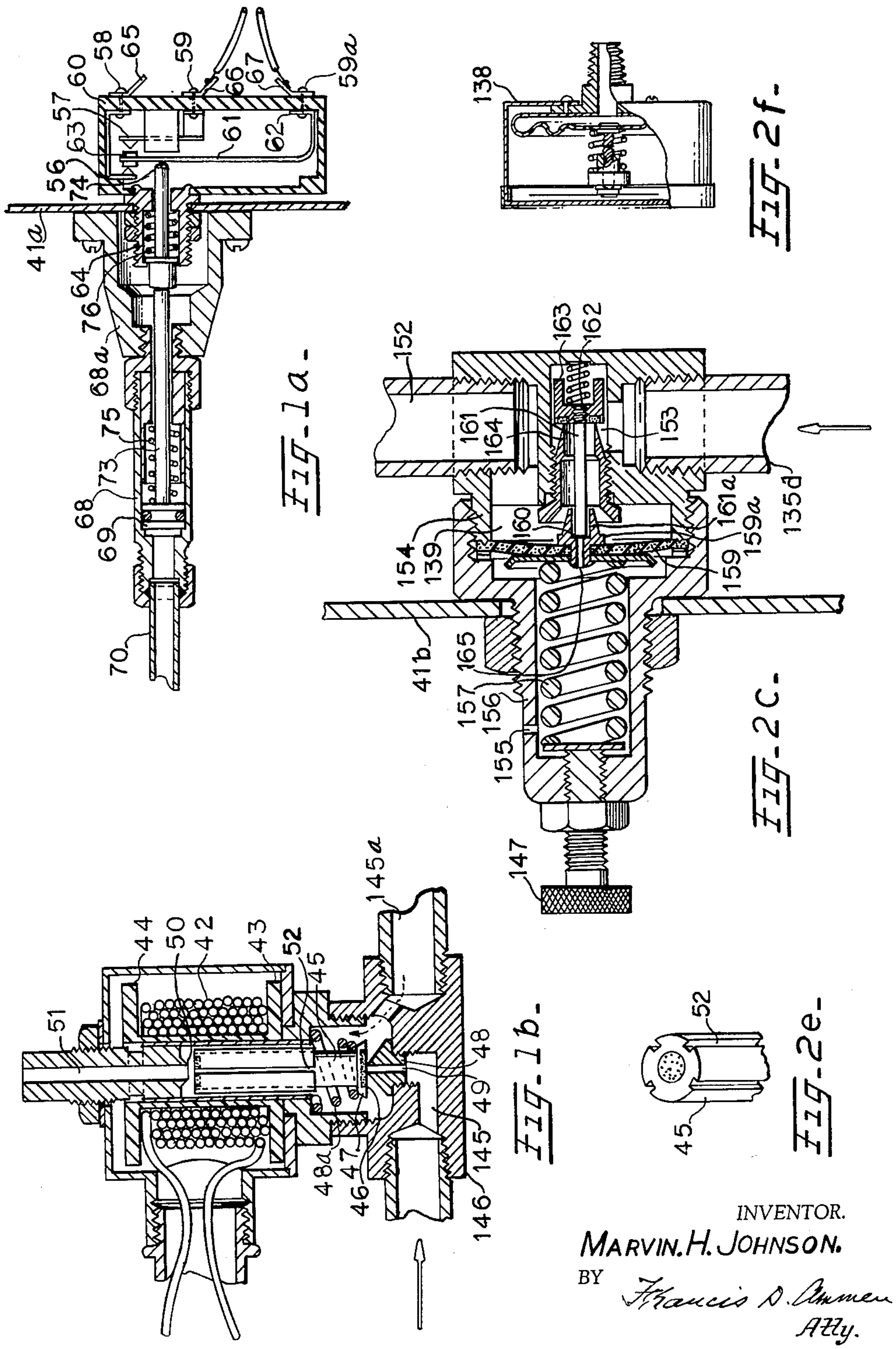

When the machine is in active operation the circuits through the three coils 42 is maintained by a switch controlled by the presence of high air pressure in a miniature control cylinder 68 of an activator A1 or A2 shown in section in FIGURE 1*a*. In order to accomplish this, two of these control cylinders are used.

As shown in that figure and FIGURE 13, behind the control panel 41 two microswitches 53 and 54 are mounted on, and against the inner face of a side wall of the panel. As the construction here is the same for both switches, it will be sufficient to describe the general arrangement of the parts, and connections between these two elements of one only of these switches, switch 53 for example.

This switch is the upper of the two shown in dotted lines at the side of the control panel 41. The construction within the switch housing 53 (FIGURE 1*a*) which is of box-form as shown here, involves the use of two small plate-form conductors 56 and 57 attached by rivets 58 and 59 respectively, to the inner face of the rear wall 60 of the insulation type housing. On the inside these two conductors present two aligning but separated confronting contact points, which in the present instance, are of conical form. Between them is a conductor plate in the form of a flat tongue 61 with a bent up foot 62 secured to the rear wall 60 of the housing and integral with a shank 63 that is itself integral with the tongue.

This tongue is sufficiently resilient to maintain its contact point 63 biased by its resilience, into effective contact with the contact point on the conductor 56 that is against the wall.

The front wall of the switch housing is carried on a threaded bushing 64 the body of which passes through an opening in the side wall of the panel 41. The bushing is secured in place by a nut and check nut as shown.

The rivets 58 and 59 secure terminal plates 65 and 66 for attachment of conductors in the primary circuit, and rivets 59*a* passing through the rear wall 60 of the housing connect the foot 62 to a terminal plate 67 for the primary circuit.

The activators A1 and A2 for the switches 53 and 54 are alike and each has a barrel 68 with a grooved piston 69 having an O-ring to pack it. The outer face of each piston is exposed to pressure of high pressure air admitted to the left side of the piston was viewed in FIGURE 1*a*.

The pipe line 70 and 70*a* respectively (see FIGURE 1) lead the high pressure air off from the pipe connections 23 and 23*a* down to the ends of the barrels of the activators (FIGURE 4*a*).

When the cylinder 22 and/or 22*b* is carrying air pressure the piston rod 73 will be moved toward the right, and its tip 74 which rests against the side of the conductor 61, will push the conductor toward the right, thereby breaking a "circuit-link" between terminal plates 65 to 67, and substituting a new circuit-link between the terminal plates 66 and 67 the instant the contact 63 touches the tip of contact 57. (See FIGURE 1*a*.)

The barrel 68 is supported at its inner end on the tapered outer end of a housing 68*a* mounted on the outer side of the wall 41*a* of the electrical control panel 41.

When the air pressure in the pressure chamber fails, two coil springs 75 and 76 associated respectively with the piston 69 and the inner end portion of the piston rod, will return the piston to its inactive position in which it is shown in FIGURE 1*a*.

In other words, this mode of operation just described enables a push button circuit in which the link of conductors between the terminal plates 66 and 67 and including the conductor 61, is used as part of the push-button circuit which includes the coils 42 of the solenoid valves 24 and 24*a* or 24*b* that can be energized to open these valves and permit flow of the compressed air through them into the cylinders 22 and 22*a* or 22*b* (FIGURE 1); the air that passes the cylinders and actuates the activator having the barrel 68 will establish a circuit which is a maintaining circuit for keeping the solenoid valves energized; and they will continue to supply air to the cylinders as long as their coils are energized. But by pushing the button marked "Stop" on the control panel the maintaining circuit can be opened, and when this occurs the spring 48*a* in each of the solenoid valves will push down the valve stem 45 which is the core of the solenoid, and the stem 45 then closes the port through which the compressed air has been supplied to the cylinders 22, 22*a* or 22*b*. And on account of the downward movement of the valve stem at this time the exhaust ports 51 of the solenoid valves will become opened and permit the cylinders to exhaust their air back through the pipe connections such as 23 or 23*a* and also passing up through the side grooves 52 of the valve core.

These circuits referred to, and others illustrated in FIGURES 13 and 14, will be more fully described hereinafter.

Referring now to FIGURES 6, 6*a*, and 7 and 8, it will be noted that there are three sheaves 77 for supporting the run 11 of the belt 12 with axle pins 78 the ends of which are supported in a frame plate 113 and a stringer plate 80 on the near side.

Carrier 29 that pivotally supports the presser disc preferably is supported on the lower end of the ram 19 so that it is adjustable longitudinally to the path of work. This is accomplished by employing bolts 81 on the lower end of the ram 19 and horizontal slots 82 on the upper end of the carrier 29 and clamping washers 83 on the bolts for effecting a tight connection. (See FIGURES 6 and 11.) This same arrangement is used for auxiliary ram 19*c* and carrier 29*c* (FIGURE 12).

It is desirable to support the tucker disc 17*a* so that it can be cocked into an inclined position as shown in FIGURE 7. This enables the working edge 84 to push the tucked in edge 8*b* of the screen material over against the inner side of the channel in the frame 5. This is accomplished by providing the hanger block or boot 85 that carries the disc 17*a* with two vertically aligning adjusting bolts or set-screws 86 with ball-form tips or conical tips 87 to fit into sockets 88. The preferred bolt system is shown in FIGURES 6 and 6*a*, including the use of two pairs of vertically aligned tension bolts 89 located on opposite sides of the cone tipped thrust exerting set-screws.

In addition to this ready control over the tucker disc 17*a*, it is also desirable to provide means whereby the disc can be cocked in a different plane from the one just described, that is to say, a plane arrived at by virtually rotating the boot or block 85 on a vertical axis, as illustrated in FIGURE 6*b*. This manipulation of the disc **17*a* is graphically shown by the inclined position of the dotted outline 17*c*** of the disc which is also shown in FIGURE 6*b* to indicate the degree of the angle through which the virtual rotation has occurred.

This adjustment, of course, is arrived at by manipulating the screws 86 to give them the same advanced position on their threads, and also rotating the pairs of bolts 89 that are on the same side of the vertical plane passing through the adjusting screws 86 in the right direction.

This adjustment enables the disc to have a somewhat better effect in the tucking in operation of the overlying edge into the channel 9, and without developing undesired stresses in the body of the screen panel.

Referring again to FIGURE 6, it will be noted that the splining disc **17*b* is located a considerable distance to the right, beyond the two discs 17 and 17*a*, which latter should be rather close together; that is to say, the point where the tucker disc is bending down the marginal end of the screen material should be as near to the point of tangency between the face of the pressure disc 17**, and the panel, as is reasonably possible, for controlling effect to the screen panel.

Reference now should be made to FIGURE 2*a* which illustrates the supply spool or drum 91 for the spline material 92 which is wrapped on the outer face of the drum, and in this connection there is an improvement in the way the drum is mounted that facilitates maintaining the leading down of the drop-line 93 which hangs down in a vertical line where its lower end 94 is located quite near to the left edge of the disc **17*b*, beyond which point it passes through a guide 95 with its extreme end 96 in a convenient position to be seized by the operator and pulled down and placed into the channel 9** manually, when starting the spline into the channel.

In order to keep the depending run of the spline in a vertical plane above the point where the splining takes place the drum 91 is loosely rotatable on a round bar whose ends rest in open U-shaped sockets **90*a*** (see FIGURE 4*a*), that are located at the upper ends of two forks 90 with inset bases **90*b* that are bolted to two seats such as the seat 90*c*** shown at the left in FIGURE 2*a*.

With this organization of these parts just described, the tension in the line 93 hanging down will tend to pull the drum to the point on the shaft **91*a* that is nearest to the left edge of the disc 17*b***.

In starting the splining operation the operator should place the end portion of the spline into the groove as stated above, and then depress the button on the control panel that has the marking **18*b* on it, which will close a relay circuit which will effect the advance of the ram 19*b* and cause it to move down to the working line, and exert its force at the V groove 97 to push the spline down into the panel; and in order to facilitate this operation the face of the splining disc that is remote from the operator's location has a machined face 98 (FIGURE 8), adjacent to which there is a cylindrical hub 99, over which the central opening of a tough resistant rubber disc 100 fits; and the outer face of this rubber disc is re-enforced by a steel plate 101 with a central opening 102 that fits against a circular shoulder formed on the hub of the disc. This steel plate may be held in place by a plurality of countersunk screws 103**.

The lower portion of the section of this disc as shown in FIGURE 8, shows that the periphery of this rubber disc 100 cooperates in the act of forcing the spline down into the channel. This cooperation involves the development of resistance by the material of the rubber disc at the bending line against any tendency of the material of the screen 8 to become elevated when the spline is forced down into a rudimentary inner channel 104 within the channel 9.

As this disc **17*b* should roll very freely on the compressed spline as it is being laid into the channel, it is preferably mounted to rotate on a ball bearing 105. Incidentally, discs 17, 17*a* and 17*d* are mounted to rotate on ball bearings as indicated for disc 17*b***.

The lower portion of the pendant 93 of spline material passes through a guide 95 that is secured by machine screws 107 to the forward edge 106 of the carrier block **28*a* that carries the splining disc 17*b*, and the lower portion of the guide presents a slot 108 between two forks 109**, between which the adjacent edges of the splining disc revolves, as shown in FIGURE 6.

They guide the spline down to the lower edge of the splining disc where the disc forces it down into the channel 9 where it "locks in" the tucked-in edge of the screen panel; and the part at the bottom of the channel 9.

One of the objects of this invention is to construct the apparatus so that it will be capable of mounting screens in screen doors. Such doors have relatively long screen area in the upper portion of the door, which generally does not extend down to the lower edge of the door.

Accordingly, this machine preferably has the features of construction illustrated in FIGURE 11, and involves the problem of providing a special mounting for the three control devices A, B, and C that requires mounting them on a carriage 110 shown in FIGURES 1, 2*a*, 4*a*, and in FIGURE 11 on a larger scale.

The carriage 110, which may be a casting of bar form, is supported to slide on the upper face of a guide arm 111, that is attached to the vertical face 112 of an upright frame plate 113 of the machine, that lies in a parallel plane with respect to the direction of advance of the work.

The guide arm 111 has a longitudinal slot 114; and a bolt 116 extends up through the slot and into the carriage 110. The carriage has two arms **110*a* and 110*b* against which two collars 117 and 118 on the plain stem 120 abut. Set screws 122 secure the collars to the stem 120**. (See FIGURE 11.)

A sprocket wheel 119 is rigid with collar 117. This construction shown in FIGURE 11 is duplicated at the right and left with a sprocket chain **119*a*** connecting the two sprocket wheels (FIGURE 2*a*); and when the bolt screws 116 are loosened up, a squared head **123*a* on the end of the stem 120 facilitates its rotation with a wrench, at a threaded opening 124 in frame plate 113**.

A right hand rotation of the adjusting screw 121, as shown in FIGURE 11, would move the screw and the carriage toward the left, and away from the extreme right position in which the carriage is shown in FIGURE 11.

Or with a less amount of rotation the bar 128 could be adjusted to present the guide blocks 125 as a guide to align the control devices A, B, and C up against the end of a "kick-plate" **5*c*** of different width.

As indicated in FIGURE 2*a* there are two of these adjusting screws and the one illustrated in FIGURE 11 is the one at the left in FIGURE 2*a*.

Also as shown in FIGURE 11 the carriage 110 has an upwardly extending neck 126.

This neck has a flat upper face 127 that seats against the under face of the bar 128; and two screw bolts **128*a* with countersunk heads pass down through the bar 128; their threaded ends are screwed in tapped sockets 129 in the neck 126. And a tie-plate 130 lies across the under face of the bar 128 that carries machine screws 131 the upper ends of which are threaded into sockets (not illustrated) in the bottom portion of switch housing A. Screws 131** can be loosened and then tightened after switch housings have been orientated.

In FIGURE 11 the screen door presents its transverse channel **9*a* in line with the presser disc 17 and the tucker disc 17*a* ready to start their operations on this part of the screen door. A dotted line indicates the location of the screen material 8*a***.

Also in viewing FIGURES 1, 3, 5 and 9, the fence 7 with its guiding edge 6 mounted on a casting of clevis form 132 and secured by tension type bolt 132a with washer and bolt passing through an elongated hole 132b for alignment of the guiding edge 6 in relation to the guiding edge of guide blocks 125 (FIGURE 9). Incidentally there are two of these castings supported at the left atop bar 128 (FIGURE 1), retained by keeper bars 132c through the use of tension type bolts 132e.

In order to supply relatively high pressure air to the upper chamber of the cylinders 22, 22a, and 22b (FIGURE 2a), cylinders 22, 22a, 22b and 22c (FIGURE 12), and relatively low pressure to their lower chambers for returning their pistons and the rams 19, 19a, 19b and 19c, a manifold 133, shown in FIGURE 1, is supplied with high pressure air through a hand valve 134.

Referring now to FIGURES 1 and 2a, this manifold 133 is composed of continuously connected pipe sections. The pipes 134a, 134b, and 134c designated to supply high pressure air from cross-pipes 135 delivering the air through T connections 136 of regulators.

From each of the T connections 136, a pipe 137 extends upward to an elevated point and connects to a pressure gage 138 as shown in FIGURE 2a, which of course, indicates the air pressure existing in the chamber 139 shown in detail section through the regulator. (FIGURE 2c).

In reading the plan view FIGURE 1, with FIGURES 2a and 4a, it should be noticed that the four gages 138 are directly in line horizontally with each other and at a higher level than the regulators 141, including the connecting points 142 for which are all shown on the panel 41b already referred to. To make this arrangement clear, the air control panel 41b carrying the regulators is shown in horizontal section just above the level of one of the regulators 141. (FIGURE 1.)

A detailed section through one of the gages 138 is shown herein on the same sheet of the drawing that carries a detail section of one of the regulators 141.

The details of one of the regulators which is preferable to use, and which are obtainable on the market, will now be described.

Referring now to FIGURE 1, 1b and 2c, there are four of these regulators that function to regulate the pressure of the air; three of them connect to pipings 143a, 143b and 143c, that extend back and then laterally with short extensions 144 that lead the air into the inlet chambers 145 in the lower part of valve bodies 146 of the three-way solenoid 24, 24a, and 24b already referred to, that supply the high pressure air at proper times to the three cylinders 22, 22a, and 22b.

The fourth regulator 141d, located at the rear, has its adjusting screw 147 set for a relatively low pressure because the lower pressure air is to be supplied to the lower chambers at the points 148, as indicated in dotted lines in FIGURE 2a, but coming from the tank 72.

This delivery is effected through the pipes 150, one for each of the cylinders, which receives its low pressure air from the tank 72, as shown in FIGURES 1, 2a and 12. Tank 72 receives its low pressure air by the pipe 152 shown in FIGURE 1.

While the coils in the two solenoid valves 24, and 24a are energized compressed air will fill cylinders 22, 22a, but when the Stop button is depressed, the coils of these two solenoids will be de-energized, whereupon the conical spring 48a will close the port 49 through the conical seat for it in this valve, and this will also open the outlet 51 to air on the upper end of the valve. The air in the cylinder will then return through the pipe connections to the solenoid valves in a reverse direction from that indicated by the arrows; and the air will pass through the right hand valve chamber and flow up the grooves 52 in the side of the core 45, and will flow up the exhaust port 51 to the atmosphere, at the upper end of each solenoid valve.

One of the regulators 141d, controls the discharging of the low pressure air from the lower end of all the power cylinders if the pressure becomes excessively high in their lower ends such as would possibly interfere with the development of the necessary downward pressure exerted by the rams for the presser roller and the tucker disc.

The high pressure air in the fourth power cylinder 22c that develops the pressure for the additional presser roller would also be exhausted to atmosphere in a similar manner. (See FIGURE 12.)

When the high pressure air in the upper chambers of the cylinders exhausts, then the relatively low pressure in the inner air chambers of the cylinders will return all of their pistons with their connected rams to their elevated position of rest.

As stated above, regulator 141d that controls the pressure of the air in the lower chambers of the power cylinders 22, 22a, 22b, and 22c, is set for a much lower working pressure than the other regulators provide for the relatively high pressure air used in the upper chambers of the cylinders.

The regulator 141d is so constructed that it not only functions to return the pistons of the cylinders to their positions of rest after the completion of a screening operation, but also to operate as a relief valve to permit escape of enough air from beneath the pistons and retaining enough air pressure to prevent the rams from delivering a crashing blow to the work when they are forced down by the high pressure air above their actuating pistons. In other words, the low pressure should act as a cushion as the rams descend and settle down gradually to the low position with a sufficient pressure to enable the presser roller or rollers and the tucker disc and the splining disc to press with sufficient force to function properly.

In order to accomplish this the regulator 141d is constructed so that it includes a vent or bleeder port that will function as an escape for some of the air in this local portion of the air system to terminate the cushioning function by finally tapering off the cushioning effect, as it were.

This will now be described.

Referring now to FIGURE 2c, which is a horizontal section of this particular regulator:

As illustrated, it receives the air from the end of the manifold 133 through its supply pipe 135d, from which the air enters a valve inlet-chamber 153, which is of tubular form, stemming off from a larger pressure chamber 139 in the valve body 154 of regulator.

The tubular chamber carries a valve closure 163 the forward face of which may rest against a seat which is the end face of a threaded bushing 164 fitted into the inner end of the wall of the tubular chamber.

In order to assist in the cushioning effect that is developed below the pistons of cylinders 22, 22a and 22b, when high pressure air is admitted to the cylinders, above their pistons, this particular low pressure regulator 141d preferably has a bleeder port 155 through the wall of the bonnet 156 that functions as a housing for the spring 157. This spring resists outward movement of the diaphragm 159 developed by any rise in the low pressure air that is present in the valve chamber 139 that is maintained through its delivery pipe 152.

However, the section of this regulator illustrated in FIGURE 2c shows this regulator in its normal closed position; that is the relation of the parts of this valve when the pistons of the cylinders and the rams are down to hold the presser disc, tucker disc, in operating position.

When the liberation of the high pressure air in the cylinders takes place, the upward withdrawal of the pistons reduces the pressure under them; and this drop in pressure occasions a flow of air from the chamber or air tank 72 that provides low pressure air to lift the pistons up to their elevated position of rest.

This is also accomplished by an inward movement of the diaphragm 159, due to the reduction in pressure in the chamber 72; and that enables spring 157 to increase the pressure of a shoulder 160 on the tapered bushing against the left end of a stem 161. This stem 161 has a threaded tip 162 that is screwed into a socket in valve-head 163. This pushes the valve head away from its seat on the tapered bushing 164, thereby admitting a quantity of high pressure air from pipe connection 135*d* that flows out and up to low pressure tank or manifold 72 through pipe 152. This boosts the air pressure being exerted under any of the rams that are withdrawing any of the rollers or discs operating on the work.

In connection with the cushioning effects developed under the pistons in the cylinders 22, 22*a*, 22*b* and 22*c*, on their down stroke, if the volume of the low pressure tank 72 is not too great, a rise of pressure in its air should develop a rise of pressure in the chamber 139 of the regulator 141*d*; and this would shift the diaphragm body 159 slightly to the left as viewed in FIGURE 2*c*, which in turn would shift the shoulder 160 away from the end of the stem 161, and this of course, would permit air in the chamber 139 to escape through the port 165 at the center of the diaphragm. This port 165 associated as it is with the shoulder 160, would permit air to escape into the space within the bonnet 156, and from there to find exit through the vent port 155 to the atmosphere.

In this connection attention is called to the intentional loose fit of the plain male end of the stem 161 and its socket 161*a* in the bushing 159*a* that carries the port 165 leading the air toward and to the bleeder port 155. This clearance around the stem increases the escape of the air.

The general effect of this apparatus now being described is to permit the escape of the air in front of the lowering pistons, but to restrict its escape too rapidly at the bleeder port 155, if in practicing the invention, it seems necessary, means could be mounted at the bleeder port 155 for adjustably restricting the effective opening at the port to regulate the action of the cushioning effect.

The pressure of the high pressure air admitted to the cylinders 22, 22*a*, 22*b*, and 22*c* should depend somewhat upon the kind of screen material that is being worked with. For example, if using piston diameters in these three cylinders of about 1⅛" inches, if the material is vinyl the preferred pressure should be approximately 50 to 60 lbs per square inch; for aluminum about 60 to 70 lbs.; and for galvanized iron about 75 to 95 lbs. per square inch.

Referring now to FIGURES 13 and 14, both of which diagrammatically show the wiring employed in practicing this invention; however, FIGURE 13 shows the circuit diagram as directly applied to the parts and elements of the invention, while FIGURE 14 is a symbolic diagram.

Figure 4B:
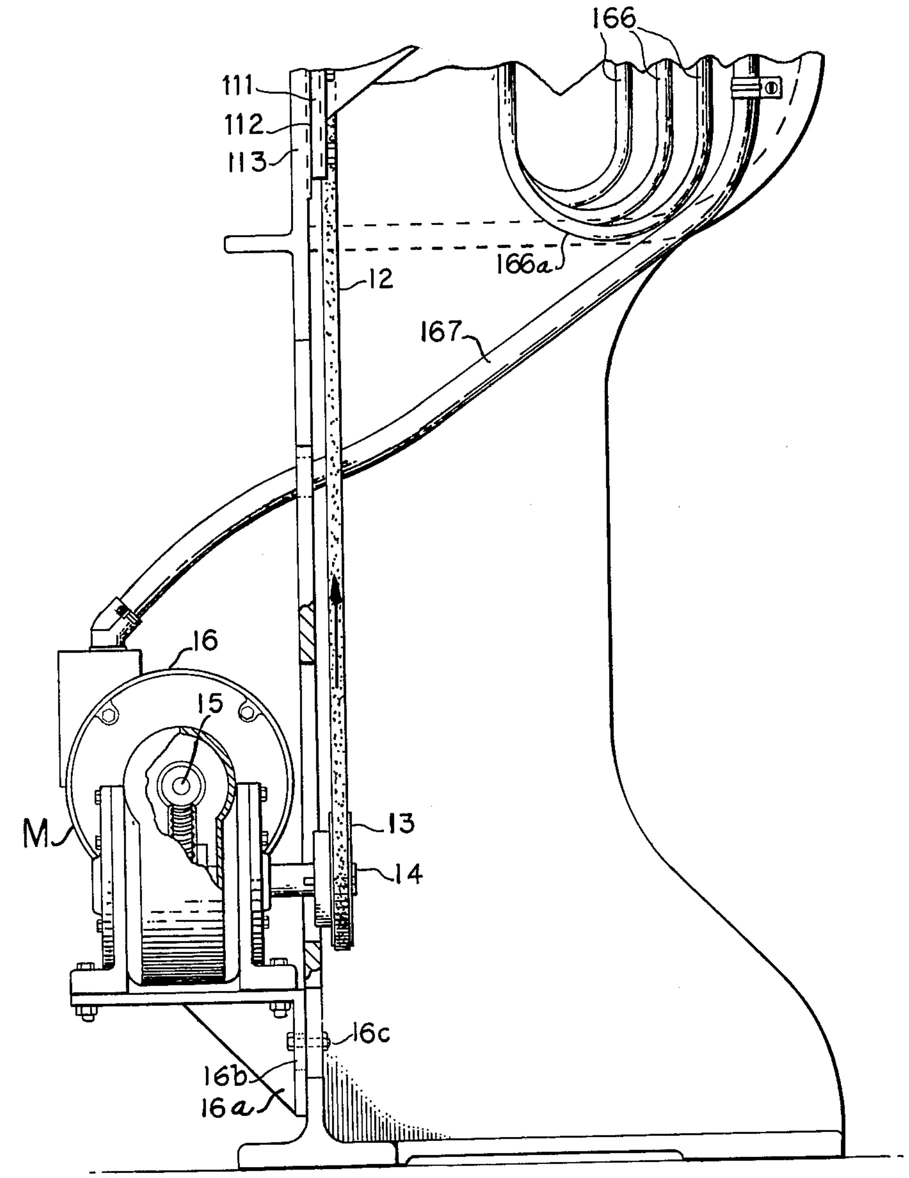

From the interior of the control box circuit wires M1 and M2 pass down through a housing tube 167 carrying insulation (not shown), which tube leads down to the motor M shown in FIGURES 4*a* and 4*b*.

The companion wire conductors connected up to the control switches S1, S2, and S3, shown in FIGURES 9 and 10, that is to say, the grouped wires that issue from these three switches are carried in insulation 165 in three flexible sheath type cables 166, and these cables are disposed in substantially parallel arrangement including loops 166*a* illustrated in FIGURE 2*b* and as shown in FIGURE 4*a* where they are shown leading through the bottom wall of a switch control box CB closed on one side by the control panel 41.

Through the outlet 168 shown in FIGURE 13, the circuit wires already described that serve the three-way solenoid valves 24, 24*a* and 24*b*, to which the circuit wires are housed in separate flexible conduit 169 (see FIGURES 1 and 4*a*).

The connections for the three conduits are effected at a distributing box 170 into which the wires pass from the outlet. To facilitate the making of the wire connections the distributing box has a removal lid 171 (FIGURE 4*a*).

It is necessary to refer again to FIGURE 7 that illustrates a mounting means for the tucker roller 17*a* that makes it desirable to use a vertical section through the guide blocks 125 to show how one of the control switches is enabled to carry its own lever 34 so as to swing freely in a horizontal plane below the guide block.

The guard block 125 is attached to the forward face of the wall 172, viewed in FIGURE 7, by long screws 177 that pass in from the front. The forward faces of the three guide blocks 125 are, of course, in alignment with the forward side of the fence.

In this FIGURE 7 the forward wall 172 does not extend down to the level of the bottom 173 of the housing for the switch, as this will leave a space at 174 for unobstructed movement of the switch lever 34 the butt end 175 of which has a tight fit in the lower end or head 176 of the shaft 36 for the cams 36*a* and 37 of the switches. (See FIGURES 9 and 10.)

As shown in FIGURE 7 presser wheel 17 securing screen 8 to inner edge of channel or groove in frame, while adjacent tucker wheel tucking in the marginal overlying screen edge. That is to say during the tucking in operation a downward pull is developed on the side portion 8*b* in the forming of the rudimentary inner screen channel. The presser wheel eliminates the influence of the downward pull on the screen panel 8. Consequently the alignment of the screen panel is maintained.

In FIGURE 12, the presser wheel 17*c*, and its carrier 29*c* that is adjustably attached to ram 19*c*, to which the impellment of power cylinder 22*c* is connected. This presser wheel and the connected parts are identical to presser wheel 17 and its counterparts (FIGURES 2*a*, 6, 11).

FIGURE 12*a* illustrates how the V-groove 97*a* exerting pressure upon the spline during the spline implacement in groove or channel 9. A downward pull is developed on the over hanging edge 8*b* of screen panel, can cause an upward wave-like displacement of the screen material as at the point *a*, and this downward pull tends to put a tension-like "draw" in the material in the direction of the arrow *b*.

By applying the flat cylindrical face *c* of the presser roller 17*c* as illustrated in FIGURE 12*b* prevents the downward pull to develop the "wave" form and tension draw in the screen panel material.

In FIGURE 12, 12*b*, the latter is a partial view of the splining wheel 17*d* with V-groove 97*a* in cylindrical face, which is pivotally supported by carrier block 177 that is attached to ram 19*b* by use of tension type bolts.

In general, three of the four push buttons shown in FIGURE 13 close electrical circuits which are primary circuits that are immediately modified by establishing them with maintaining circuits, excepting, of course, the button which is marked as a "Stop" button, and that button is always in circuit, that is, it can always open the motor circuit.

As indicated in FIGURE 14, in which the four solenoid valve coils are shown, they are connected in two parallel of branch circuits. This arrangement is used because in the present invention the ram 19*c* for the auxiliary presser roller, ram 19*b* for the splining disc 17*d* are advanced simultaneously in pairs from their normal withdrawn position to the working line to the path of work.

The mode of operation of the apparatus including the wiring is as follows:

The screen frame should be laid flat on the table of the machine with the grooved or channel side of the rigid member or frame uppermost. The screen (or wire cloth, etc.) over the opening should be superimposed, and if the part to be screened is a frame the width and length of the screen should be sufficient in dimensions to completely cover the opening, with a marginal edge of uniform width as may be necessary when the panel of screen material is centered on the frame, to cooperate with the design of groove or channel in the frame.

The start button is then depressed to start the motor running, and this, of course, starts the horizontal run 11 of the V-belt which advances the work along its path.

The screen frame is then pushed against the fence 7 and the side of the frame 5 rides against the forward aligning surface 6 of the fence, as shown in FIGURE 1.

In FIGURE 14 the electric circuits include conductors L1 and L2 connected to a suitable outside power source by a master switch MS provided for a manually closing circuit through the above mentioned conductors.

When the start button is depressed it closes a starting circuit for the motor starter which is as follows: from T2 of terminal strip through conductors *a*1 to T9, through closed start button to T8 and from T8 to conductor *a*4, to interlock terminal *a*5 of the motor starter; thence from *a*5 through conductor *a*6 and through solenoid coil *a*7 which it energizes, and then from the coil through *a*8 to contact terminal *a*9, and from *a*9 through *a*10 to T1 of the terminal strip.

Energizing the solenoid coil of *a*7 of a gang-switch GS (see FIGURE 13) lifts up its core X, which is attached to a carriage X1 of insulating material carrying the spring biased bridge-type contacts *b*7, *a*11, and *a*12, that can connect to fixed contact as shown in FIGURE 13, to close their respective circuits. In this way a control circuit is maintained for a motor circuit and will now be outlined:

From T2 through conductor *a*1 to T9, thence through normally closed-stop button to T10, then through conductor *b*2 to terminal *b*3 of switch S2 and through S2 to terminal *b*4, and from *b*4 through conductor *b*5 to terminal *b*6 of the interlock, through closed movable contact *b*7 to interlock-terminal *a*5, and thence through conductor *a*6, and solenoid coil *a*7, and through conductor *a*8 to stationary contact terminal *a*9; from *a*9 to conductor *a*10 to T1 of power source. Opening of the maintaining circuit that is set up from the motor starter circuit can be accomplished by depressing the stop-button.

The purpose of the motor starter is to control the motor through the motor circuit, and the motor circuit is as follows: from T1 through conductor *a*10 to stationary contact terminal *a*9, through movable contact *a*11, through stationary terminal to which conductor M1 is connected. Conductor M1 supplies power to or from the electric motor. To complete the circuit that is from T2 through *a*14 and *a*13, through movable contact *a*12 to stationary contact terminal to which conductor M2 is connected. Conductor M2 supplies power to or from the motor.

When the work has been conveyed past switch S1 and strikes switch actuator arm 34, closing switch S1 the advance of the work continues until the frame strikes switch operating arm **34*a* of switch S2, and the movement of that arm opens the motor starter control circuit and movement of the work then stops in the proper position for the operator to commence the securing of the screen material to the frame 5**. When switch S2 is opened the opening of motor starter control circuit occurs between terminals *b*3 and contact *b*4 in said circuit.

Before presser wheel 17 and tucker wheel **17*a* are brought down into position to perform their respective functions, alignment of the screen frame should be checked to see that it has the work abutting against the vertical forward face 6 of the fence, or the guide blocks 125 on the switches S1 and S2, and also to see to it that the screen area is properly centered so as to have margins of equal length or width overlying the channels 9 of the screen frame, that is to say, the channel in the side member of the frame which is adjacent to the side blocks 125** of switches S1 and S2. This channel should be coincident to the plane in which the tucker wheel lies; if not, correction should be made by movement of the fence and switch bar carriage through the adjusting means illustrated in the drawing.

When the above has been accomplished push button **18*a*** is depressed to bring the hold-down wheel and tucker wheel in position of operation. This is achieved through an electrical circuit and the air mechanical means.

The electrical circuit is as follows: from T2 through conductor *a*1 to T9 through normally closed stop button circuit to T10 through *c*1 to T4, from T4 through closed push button **18*a*** to T3 through conductor *c*2 to terminal *c*3 of solenoid valve coil 24 and through coil to *c*4 through *c*8 to terminal *c*6 of solenoid valve coil **24*a*. Solenoid valve coils 24 and 24*a*** are connected in parallel, so that the current flows also from terminal *c*3 through conductor *c*7 to terminal *c*5 and through coil **24*a*** to terminal *c*6 and thence through *c*9 to T5 through *c*10 to terminal *c*11 of switch S1 through this closed switch to terminal *c*12 and through conductor *c*13 to T1. As this current flows through this described circuit, solenoid coil of solenoid valve 24 becomes energized and solenoid coil of solenoid valve **24*a* also becomes energized so that both these valves 24 and 24*a* pass air to their respective cylinders, that is, their hold down cylinder 22, and to their tucker wheel cylinder 22*a***.

Each cylinder has a piston rod which is connected to their respective rams, hold-down wheel, and tucker wheel, which are attached to their respective rams. When sufficient air passes through solenoid valves, hold-down wheel, and tucker wheel advance to the work to be performed. At the time as air passes through valve 24 to hold down cylinder a portion of the air goes through pipeline to activator cylinder A1 which closes switch 53.

Switch 53 is connected in parallel to push button **18*a* so when push button 18*a* is released, the switch 53 when closed acts as a maintaining circuit to the push button circuit 18*a*** and connected circuits when said button is released. This parallel circuit is connected to T3 and T4 and comprises a conductor *c*15 switch 53, and conductor *c*14 which is connected to T4.

The next step of the screening operation is to depress the start button and hold it in for a moment and if necessary repeating this operation so as to advance the work little by little toward switch S3 in switch housing B. Before the forward end of the work, that is, the forward end of the frame, closes S3 switch but is in close proximity to its actuating lever 34 the start button should be released thus stopping the motor.

When the work is stopped in proximity to the S3 switch lever, at this juncture the splining operation should be started by placing the loose end of the pendant spline 96 line over the groove or channel at the leading end of the frame; the end of the spline line should be laid lengthwise over the channel for a distance of approximately one and one-half inches. Then push button **18*b*** should be depressed, causing spline wheel to descend and force the spline down into the groove or channel.

The descent of the spline wheel is implemented through an electric circuit that opens its corresponding solenoid valve to admit high pressure air to the upper end of the cylinder **22*b* and auxiliary cylinder 22*c***. The electric circuit in accomplishing this is as follows: T2 through conductor *a*1 to T9 through normally closed stop button to T10, and conductor *b*2 to terminal *b*3 of switch S2, through closed switch S2 to stationary contact terminal *d*1 through conductor *d*2 to T7, through depressed (closed) push button **18*b*** circuit to T6, from T6 through *d*3 to coil terminal *d*4 and then through solenoid valve coil **24*b***. Electrical current also flows from *d*4 through a conductor to terminal of auxiliary solenoid valve coil **24*c*** through this coil and conductor that is connected to terminal *d*5 and then from *d*5 through conductor *d*6 to T1. This valve **24*c*** is shown in dotted line drawing FIGURE 14.

As the current flows through this described circuit, the solenoid coil of the solenoid valve **24*b* becomes energized and passes air to the splining air cylinder 22*b*. The piston rod of the splining cylinder 22*b* is connected to the splining ram 19*b*** which carries the V-groove splining wheel.

Some of the air that passes through the solenoid valve **24*b* goes to the splining cylinder, but a supply of the air also goes through pipe line 70***a* to the activator cylinder A2 which immediately closes switch 54.

Switch 54 is connected in parallel to the push button 18*b* of the last described circuit, and consequently acting as a maintaining contact for push buttons 18*b*, this parallel circuit is connected to T6 and T7 by means of a conductor *d*7 from T6 to terminal *d*8 of switch 54 and through closed switch 54 to contact terminal *d*9 through *d*10 to T7.

At this juncture in the mode of operation the operator depresses the start button and holds it depressed at a short interval, but long enough to enable the work to act upon the lever 34 of this switch, and this holds switch S3 closed while the screen frame is gliding along the bent end of lever 34. This closing of switch S3 establishes a closed circuit parallel connected to the open circuit of switch S2 that was previously opened when screen frame acted upon the actuator arm 34*a* of switch S2 and caused the motor to stop, as already described above.

When the screen frame has closed switch S3 the motor will continue to run and convey the screen frame in its path through, and during these moments when work is being performed in the screening operation, the pressure wheel, or wheels, tucker wheel, and splining wheel can be left in their working positions, and the motor only may be stopped by depressing the stop button for one second. If depressed more than two seconds sufficient air will be released through solenoid valves 24 and 24*b* to exhaust the air from activator small cylinders A1 and A2. When sufficient air is exhausted from activators A1 and A2 the activators cylinder switches 53 and 54 will be opened, and this will allow hold-down wheel, or wheels, tucker wheel and splining wheel to retract from their working position to their positions of rest.

When switch 53 is released it opens the electric circuit that energized the coils of the solenoid valves 24, 24*a* and when switch 54 is relased and opened, it opens the electric circuit through the coil of solenoid valve 24*b*, 24*c*, and the coils of solenoid valves 24, 24*a*, 24*b* and 24*c* are 3-way valves.

When solenoid valve coils 24, 24*a*, 24*b* and 24*c* become energized electrically the exhaust port 51 is held closed enabling the high pressure air port 49 to pass high air pressure to the upper chamber of their respective cylinders and also to pass air under pressure to the cylinders of the activators A1 and A2.

When solenoid valves 24, 24*a* and 24*b* become de-energized their valve stems 45 drop down and their high pressure ports 49 become closed and their exhaust ports 51 become open to exhaust compressed air to the atmosphere, that is, they are exhausting high pressure air from the upper chambers of the cylinders 22, 22*a*, 22*b* and 22*c*; and the high pressure air from the cylinders of the activators A1 and A2 are also exhausted, thereby permitting the micro-switches 53 and 54 to return to their normal open positions.

During the period of exhaust of the air from the upper chambers of the cylinders 22, 22*a*, 22*b*, and 22*c*, a lower pressure of air is constantly being supplied to the underside of the pistons of all of these cylinders by regulator 141*d* and piping means to the rod-end inlets of these cylinders. This low pressure air which would be of about 20 pounds p.s.i. assists in exhausting the air above each of the pistons by exerting air pressure against the under sides of the pistons, and causes the air on the upper side of each piston to have a relative pressure with respect to the bottom side pressure during the exhaust period.

This relative air pressure on the upper side of the pistons keeps the activators A1 and A2 from releasing the microswitches and opening their respective circuits. This relative pressure that is created in the upper chambers of cylinders 22, 22*b* causes a time delay that accounts for the two seconds required for depressing the stop buttons that was previously mentioned above in explaining the motor circuits.

The approximate 20-pound low pressure air in the lower chamber of each cylinder is the means employed to retract the pressure wheels, tucker wheel, and splining wheel from the performance of their work to their point of rest.

This 20-pound low pressure air in the lower chambers of the cylinders gives a very desirable cushioning effect to absorb the momentum of the pistons and their attached parts. When the higher air pressure is admitted to the topside of each cylinder piston it forces piston down and compresses the low pressure air on the underside of each piston head causing an increase in pressure and when this increase in pressure exceeds that of the approximate 20 pounds p.s.i. of regulator 141*b* setting, air will be relieved and exhausted through this regulator; or can be exhausted to atmosphere from the tank 72 if it is provided with a low pressure relief valve.

Referring to the third paragraph in column 17 hereof, it should be understood that the motor will continue to run and convey the screen frame along its path through the machine in the screening process. As the trailing end of the screen frame leaves switch lever of switch S1 the motor will continue to run and convey the screen frame in the screening process.

As the trailing end of the screen frame leaves switch S1 (FIGURE 10) its switch-activating arm 34 will return to its normal position, and upon so doing switch S1 will become opened between terminals *c*11 and contact terminal *c*12. As a result of the opening of switch S1 solenoid valves 24 and 24*a* become electrically de-energized; hold-down wheel 17 and tucker wheel 17*a* will then retract from the work. This retracting is accomplished while the screen is still in motion, and the splining wheel is still placing the spline in the groove or channel.

As the screening frame of the work is still in motion its trailing end will leave switch S2, and the switch actuator arm 34*a* of switch S2 will then return to its normal position. Upon so doing contact in switch S2 will be opened between terminal *b*3 and contact terminal *d*1. The result of this operation of switch S2 is that solenoid valves 24*b* and 24*c* become de-energized and the splining wheel 17*d* and hold-down wheel 17*c* will retract from the work line.

When the screen frame broke contact with actuator arm 34*a* of switch S2, upon the return of this arm to its normal position, this switch also becomes closed between terminal *b*3 and contact terminal *b*4 to provide electrical continuity to motor starter control circuit, so the motor will continue to run when the screen frame leaves or is removed from, switch S3, and activator arm 34 returns to normal position; in so doing switch S3 will be opened at terminal *e*2 and contact terminal *e*3. This opening of switch S3 has no effect on stopping the motor due to the prior closing of switch S2 from *b*3 to contact terminal *b*4.

At this point of the screening process the screen panel has been attached, and secured by the use of vinyl spline or other similar material. This completes the operation on one side only of the screen frame.

In order to continue the spline operation it is now necessary to bend the spline that is, of course, still attached at the end of the channel that has just been completed, through ninety degrees and push it down into the intersection of the channels, by hand; in doing so the spline at the corner should be pushed down to the bottom of the channels.

The frame is then left lying on the table but is rotated by hand through ninety degrees, preferably counterclockwise, and then moved into contact with the fence so that the frame can be glided along the fence, and the operator continues to move the frame until it comes into contact with the V belt which conveys it toward and past switch S1, and the leading end of this side of the screen frame comes into contact with the actuator arm 34a of switch S2; and the movement of that arm of switch S2 opens that switch between the points b3 and b4, and then the conveying means stops.

From this point on the procedure can be a repetition of the procedure that has already been described above in great detail.

Many other embodiments of this invention may be resorted to without departing from the spirit of the invention.

I claim as my invention and desire to secure by Letters Patent:

1. In a machine for securing the periphery of a panel of screen material in a channel extending longitudinally along the upper face of a side bar of the frame for the screen, and with an edge of the screen material overlying the said frame bar and the said channel; the combination of a machine frame, means for supporting the screen on said machine frame, means for supporting and advancing the screen frame along a fixed path so that the said frame bar moves longitudinally along its own axis, said supporting and advancing means including a belt with means for guiding and supporting said belt in contact with the screen frame to advance the same along a line in which the channel extends and into which the tucker roller forces the edge portion of the screen material, and an electric motor with a drive-pulley driven thereby, said drive-pulley located in a downwardly extended loop of said belt, and means accessible to the operator for closing a starting circuit for said motor; a hold-down carriage normally supported above the channel with means for guiding the carriage down to the channel, a hold-down disc-form roller rotatable freely on its own axis on the hold-down carriage, and so as to roll on the screen material at the edge of the channel adjacent to the body portion of the screen material; and means for advancing said carriage so as to press the edge of the hold-down roller forcibly against the screen material and thereby hold the same fixedly pressed against the said side bar at a point adjacent the side of said channel that is located toward the inner area of said screen material, a tucker-carriage supported on the machine frame, with a tucker disc-form roller rotatably supported at its own central axis on the tucker carriage with the periphery of the tucker roller located approximately in the vertical plane in which the longitudinal axis of said channel lies; means operating after the hold-down roller is holding the screen material fixedly on the screen frame, for advancing the tucker carriage toward the channel sufficiently to enable the edge of the tucker-roller adjacent the channel to force the edge portion of the screen material down into the channel to cause the screen material displaced by the edge of said tucker-roller to conform generally to the cross-section of said channel and develop an inset flange composed of the screen material lying within the said channel in said frame bar of said screen frame; a spline roller having a peripheral groove for carrying and guiding a continuous strip of spline, a spline roller carriage on which the spline roller is rotatably mounted, means for moving said spline roller carriage on said machine frame, down to the work, means for continuing the advancing movement of said screen-frame to bring the said inset flange of the said screen material abreast of the location of the spline roller and its carriage, and thereby cooperating with the advance of the work to rotate the spline roller, and to introduce the grooved edge of the spline roller down to said inset flange that is composed of the screen material, and to compress the spline carried on the periphery of the spline roller and transfer the same into contact with the said inset flange composed of the screen material; and means for withdrawing the spline carriage when the advancing screen fr-- has passed the location of the spline roller, and ferred the spline to the full length of the channel on the said frame bar.

2. A machine for securing a panel of screen material into a channel in the frame side bar, according to claim 1, including three belt pulleys, two of which are in line with the tucker roller and the spline roller respectively, and in which the third pulley is disposed forward of the pulley that is located in line with the tucker roller, said third pulley supporting an upper run of said loop, said third pulley also supporting the horizontal run of the endless belt which advances the frame that is to receive the screen material.

3. A machine for securing a panel of screen material in a side bar of a frame for the screen material according to claim 1, including a bracket supported on the machine's frame presenting a stationary seat on which the motor rests, said bracket and seat having adjustable means for raising or lowering the bracket to regulate the tension in the belt.

4. In a machine for securing an edge of a panel of screen material to a channel extending longitudinally in a side bar of a screen frame, the combination of a machine frame, a table supported thereby, and on which the frame rests with the panel superposed and centered on the frame, and with the edge to be attached overlying the channel, power-actuated means capable of advancing the frame and panel, means cooperating with the table to guide the frame and panel along a fixed path, a presser-roller located in a vertical plane coinciding with said path, and normally located with its lower edge above and in proximity to the body of the panel adjacent to said overlying edge, movable means supported on the machine frame functioning as a carrier for the presser roller and having a pivot on which the presser roller can rotate, means for activating said carrier to depress the presser roller and press it forcibly at its periphery against the said overlying superposed panel adjacent the said overlying edge, so as to clamp the material of the panel against the upper face of the screen frame to assure that the panel will move in unison with the screen frame as it advances; a plurality of control devices spaced apart from each other alongside the path of the moving screen frame and superposed panel, a tucker-roller and a movable carrier for the same supported by the machine frame, for supporting the tucker-roller above, and in line with, the said channel, said control devices having movable means projecting into the path of the forward ends of the screen frame, means controlled by said projecting movable means of the control devices when moved by the passing screen frame to move the movable carrier respectively for the presser-roller and for the tucker-roller to advance them to contact with the work and to cause the tucker-roller to apply the periphery of the tucker-roller against the overlying edge portion of the screen panel and bend the same down into the channel, and means beyond the tucker-roller for forcing a compressible spline down into the channel to lock the bent down portion of the screen material into the channel.

5. A machine for securing an edge of a panel of screen material into a channel in a bar of a frame for screen material according to claim 4, in which the means for moving the carriers for the presser-roller and the tucker-roller include pneumatic cylinders with means operatively connecting the cylinders to the carriers for actuating them.

6. A machine for securing an edge of a panel of screen material into a channel in a bar of a frame for screen material according to claim 4, in which the means for moving the carriers for the presser-roller and the tucker-roller include pneumatic cylinders with means operatively connecting the cylinders to the carriers for actuating them, and including a spline pulley above the channel .ith a movable carrier on which the spline pulley is mounted, and means controlled by one of said control devices for actuating the carrier for the splining pulley to depress the spline pulley to bring the periphery of the splining pulley into its working position in the channel when forcing the spline into the same.

7. A machine for securing an edge of a panel of screen material into a channel in a side bar of a frame for screen material according to claim 4, in which the means for moving the carriers for the presser-roller and the tucker-roller include pneumatic cylinders with means operatively connecting the cylinders to the carriers for admitting and exhausting relatively high pressure air into and from the upper ends of said cylinders for depressing said carriers; and also including a spline pulley above the channel and having its own movable carrier on which the spline pulley is mounted, and means controlled by one of said control devices for actuating the carrier for the splining pulley to depress the spline pulley and bring its periphery into its working position in the channel, thereby forcing the spline into the channel; and also including means for maintaining air at relatively low pressure in the lower end of the cylinders for returning all of the said carriers to their position of rest, controlled by at least one of said control devices.

8. In a machine for securing the edge of a panel of screen material to an elongated rigid member supporting the panel, and having a longitudinal channel for receiving the edge of the panel for projecting into the channel, and constituting the "work"; the combination of a main machine frame, an upright pneumatic cylinder supported on the frame, and having a piston within the cylinder, with a rod projecting down from the cylinder, a tucker tool connected with the piston rod, said tool having a working tip capable of projecting into said channel, means for admitting compressed air to the pneumatic cylinder above its piston to force the piston and the tucker tool down to a level at which the said working tip will project into the channel, a presser disc alongside the path of the work for pressing the panel forcibly down against the upper side of the rigid member that is to receive the panel, means including an electric motor to advance the work along a path above the channel and past the presser disc and the tucker tool to enable the tip of the tucker tool to deform the edge of the panel and force the same down into the channel, including an electric motor circuit for driving the motor, a control circuit for the motor driving circuit including control switches located along the said path of the work, actuated by the passing work for opening the motor circuit and thereby stopping the advance of the work.

9. A machine for securing the edge of a panel of screen material to a frame for the same according to claim 8, including a solenoid-controlled valve through which the air flows on its way to the cylinder when the solenoid is energized by said control circuit, said solenoid valve having an exhaust outlet that opens when the solenoid coil is de-energized to effect exhaust of the air from the cylinder above the piston; and means for supplying the low pressure air to the underside of the piston to return the piston and the tucker tool to their positions of rest at the completion of a tucking operation.

10. In a machine for attaching panels of screen material into their frames, and in which the work is advanced past a series of tools performing a series of progressive operations on the work having electric control circuits for effecting the advance of the work past the said tools, the combination of a primary starting circuit with a normally open push-button for closing the same, temporarily, and automatic means controlled by movement of the work being processed in the machine for establishing a permanent circuit derived from the temporary circuit.

11. A machine of the kind described, according to claim 10, including an electric motor and means driven by the motor for advancing the work along a path through the machine, and means projecting into the path of the work and moved thereby for effecting the establishment of the permanent circuit.

12. In a machine for securing the edge of a panel of screen material superposed on an area of a door-frame, which area is removed from the bottom edge of the door-frame, said door-frame having a transverse channel over which the said edge of the panel projects; the combination of a machine frame, a horizontal table supported thereby and on which the work rests, a horizontal driven belt run in contact with the screen frame, adjacent the table with which the channel is parallel, a carriage, means on the machine frame for guiding the carriage transversely of the belt-run with means for maintaining the carriage in a fixed position at a distance removed from the channel to suit the distance of the bottom edge of the door-frame from the channel, a bar supported by the carriage and extending parallel with the belt-run and the channel; and means carried on the bar and projecting upwardly therefrom for engaging and guiding the bottom edge of the door-frame, means for driving the belt-run at will to advance the work in a path along and above the channel; and a disc-form rotary tool having a working edge the lower portion of which extends into the channel, said disc mounted to rotate in a vertical plane and supported on the machine frame, and operating on the work to deform the said edge and force the same down into the channel.

13. A machine for securing the edge of a panel of screen material superposed on an area of a door-frame, said door-frame having a transverse channel over which the said edge of the panel projects, according to claim 12, and in which the said upwardly projecting means on the bar includes a plurality of control devices; an electric motor, and said control devices having levers projecting into the path of the work; and means controlled by the movement of said levers for developing circuits for actuating the mechanism of the said machine.

14. A machine for securing an edge of a panel of screen material to a channel in a door-frame, according to claim 12, in which the means for maintaining the said bar at distances from the channel to suit the distance of the bottom edge of the door frame from the channel, comprises a pair of parallel adjusting screws, a corresponding pair of fixed threaded sockets for the same, and means for connecting the said adjusting screws so that an adjusting rotation of one of the said screws imparts the same degree of rotation to the other screw.

15. A machine for securing an edge of a panel of screen material to a channel in a rigid member having a channel on the same, according to claim 4, in which a second, auxiliary, hold-down presser roller is mounted in the machine in close proximity to the splining roller, with a pneumatic cylinder for advancing the same from its position of rest to enable the air pressure in the cylinder to press the edge of the second hold-down presser roller down onto the screen material forcibly down onto the screen frame to hold the panel fixedly to the same.

16. In a machine of the kind described for securing the edge of a panel of screen material into a channel in a screen frame; the combination of a machine frame, means mounted on the machine frame for forcing the edge of the panel into the said channel, a splining roll of disc form having a circumferential groove at its periphery for carrying the spline and forcing the same into the channel, means for advancing the screen frame along the path parallel with the direction in which the channel extends, a drum-type reel carrying a supply of flexible spline material, means for rotatably supporting the reel about its own axis and at a higher level than that of the said path of movement of the work thereby enabling the length of the material to be drawn off from the reel leading at substantially a right angle with respect to the axis of the reel and extending toward and to the splining wheel, means for supporting the reel permitting free longitudinal shifting of the body of the reel along its own axis of rotation so as to maintain the point at which the said line leaves the side of the reel at a point maintained lying in the same vertical plane.

17. In a machine of the kind described, the combination of a table for supporting a frame that is to receive and carry a panel of screen material, a fence for guiding the frame, means for advancing the frame in a path along the fence, a plurality of devices spaced apart along the said path for effecting the attachment of the panel of screen material to the frame as it passes along its path, a plurality of control switches actuated by the frame when it passes the same, and means including switches and circuits closed by the said switches for actuating the said means for effecting the attachment of the panel to the frame, said switches each including a guide block secured to its front end, each guide block having a forward face aligning with said fence, and each switch having a control lever extending forward below its guide block and projecting into the path of the frame, to enable the position of the frame to control the time of actuation of the said attaching means.

18. In a machine of the kind described for mounting a panel of screen material in a channel in a supporting frame for the same, the combination of a table on which the supporting frame lies, means for advancing the frame through a path of movement with the screen material resting on the same, with an edge of the panel projecting across the channel, a tucker tool having a forming part for engaging the work and aligning with the said channel, a carriage for the said tool with pneumatic means for advancing the same forcibly from its position of rest to move the forming part to a point near said path and align the same for operation at the channel to cause the forming part to bend the said projecting edge down into the channel; means including a manually controlled primary circuit which when closed effects the said advance of the tucker tool; a secondary circuit operating as a maintaning circuit, and an activator controlled by said pneumatic means to close the maintaining circuit.

19. A machine of the kind described according to claim 18 including fluid actuated means for causing the activator to function; and including means controlled by the primary circuit for admitting operating fluid to the fluid-actuated means of the activator.

20. A machine of the kind described according to claim 18, in which the primary circuit includes a motor for starting the frame and panel along their path and a closed switch-button in the primary circuit capable of being closed at the will of the operator, thereby enabling a time delay for inspection by the operator.

21. A machine of the kind described according to claim 20, including a splining tool, and a splining tool carriage for the same, with means for effecting the advance of the splining tool carriage to bring the splining tool to an operating position alongside the said path of movement of the said frame and the panel carried thereby; and in which the means for advancing both the said tools includes a fluid actuated power cylinder corresponding to each carriage; and including valve means actuated through the agency of the primary circuit for admitting operating fluid to both the said cylinders.

22. In a machine for securing the periphery of a panel of screen material in a channel extending longitudinally along the upper face of a side bar of the frame for the screen, and with an edge of the screen material overlying the said frame bar and the said channel, the combination of: a machine frame; means for supporting the screen on said machine frame; means for supporting and advancing the screen frame along a fixed path so that the said frame bar moves longitudinally along its own axis; a hold-down carriage normally supported above the channel with means for guiding the carriage down to the channel; a hold-down disc-form roller rotatable freely on its own axis on the hold-down carriage, and so as to roll on the screen material at the edge of the channel adjacent the body portion of the screen material; means for advancing said carriage so as to press the edge of the hold-down roller forcibly against the screen material and thereby hold the same fixedly pressed against the said side bar at a point adjacent the side of said channel that is located toward the inner area of said screen material; a tucker roller carriage supported on the machine frame; a block-form extension carrying a tucker disc-form roller at a level below the tucker roller carriage; said tucker roller being rotatably supported at its own central axis with the periphery of the tucker roller located approximately in the vertical plane in which the longitudinal axis of said channel lies, said extension having means for supporting the same to enable the said extension to hold the tucker roller in a vertical plane above the channel, passing through the longitudinal axis of the channel, and also holding the tucker roller in a laterally inclined position of the upper portion of the roller with respect to the said vertical plane and with the lower edge of the tucker roller still lying within the said channel, said supporting means including a pair of set screws threaded in the block-form extension and located on its medial vertical axis, the lower end of the tucker carriage being provided with two sockets to receive the tips of said screws, the adjustment of which on their threads is capable of inclining the said block-form extension and the tucker roller laterally at its upper edge, said supporting means further including two pairs of bolts located laterally from the medial vertical axis of the block-form extension supporting the extension on the tucker roller carriage and cooperating when one of said pairs of bolts is loosened, and the other pair tightened, to shift the tucker roller so that its diametric vertical axis will lie in the vertical plane coinciding with the longitudinal axis of the channel, and the forward and rear portions of the tucker roller are inclined, one to the right, and one to the left, of the channel; means operating after the hold-down roller is holding the screen material fixedly on the screen frame, for advancing the tucker carriage toward the channel sufficiently to enable the edge of the tucker roller adjacent the channel to force the edge of the screen material down into the channel to cause the screen material displaced by the edge of said tucker roller to conform generally to the cross section of said channel and develop an inset flange composed of the screen material lying within the said channel in said frame bar of said screen frame; a spline roller having a peripheral groove for carrying and guiding a continuous strip of spline; a spline roller carriage on which the spline roller is rotatably mounted; means for moving said spline roller carriage on said machine frame down to the work; means for continuing the advancing movement of said screen frame to bring the inset flange of the said screen material abreast of the location of the spline roller and its carriage, and thereby cooperating with the advance of the work to rotate the spline roller and to introduce the grooved edge of the spline roller down to said inset flange that is composed of the screen material, and to compress the spline carried on the periphery of the spline roller and transfer the same into contact with the said inset flange composed of screen material; and means for withdrawing the spline carriage when the advancing screen frame has passed the location of the spline roller, and transferred the spline to the full length of the channel on said frame bar.

References Cited by the Examiner

UNITED STATES PATENTS

| | | | |
|---|---|---|---|
| 275,358 | 4/83 | Condict | 121—23 |
| 739,343 | 9/03 | Peregrine | 140—109 |
| 1,026,789 | 5/12 | Darlinton | 140—109 |
| 2,539,599 | 1/51 | Tubbs. | |
| 2,695,445 | 11/54 | Johnson et al. | |
| 2,737,834 | 3/56 | Coughlin et al. | 80—26 |
| 3,077,907 | 2/63 | Gottlieb | 140—109 |

CHARLES W. LANHAM, *Primary Examiner.*

RICHARD A. WAHL, *Examiner.*